United States Patent

Katou et al.

[11] Patent Number: 5,942,869
[45] Date of Patent: Aug. 24, 1999

[54] MOBILE ROBOT CONTROL DEVICE

[75] Inventors: Hironori Katou; Ichirou Ueno, both of Saitama, Japan

[73] Assignee: Honda Giken Kogyo Kabushiki Kaisha, Tokyo, Japan

[21] Appl. No.: 09/021,411

[22] Filed: Feb. 10, 1998

[30] Foreign Application Priority Data

Feb. 13, 1997 [JP] Japan ..................................... 9-42878
Feb. 13, 1997 [JP] Japan ..................................... 9-42879

[51] Int. Cl.$^6$ ........................................................ B25J 5/00
[52] U.S. Cl. ............................................ 318/568.12; 901/1
[58] Field of Search ........................... 318/568.11, 568.12, 318/568.16, 580, 587; 901/1, 47; 395/90, 93; 701/23, 27

[56] References Cited

U.S. PATENT DOCUMENTS

| | | | |
|---|---|---|---|
| 5,446,356 | 8/1995 | Kim | 318/587 |
| 5,479,079 | 12/1995 | Jeong et al. | 318/568.12 |
| 5,548,511 | 8/1996 | Bancroft | 318/568.12 |
| 5,687,294 | 11/1997 | Jeong | 318/568.12 |

FOREIGN PATENT DOCUMENTS 5-46246   2/1993   Japan .
5-257533 10/1993   Japan .

Primary Examiner—William M. Shoop, Jr.
Assistant Examiner—Rina I. Duda
Attorney, Agent, or Firm—Armstrong, Westerman, Hattori, McLeland & Naughton

[57] ABSTRACT

When a difference between sums of distance measurements detected by the left and right side sensors of a robot 1 is greater than a reference value, the turn is performed to avoid an obstacle ahead. If the direction of the current turn is opposite to that of the previous turn, since the angle of turning in the current turn is decreased, the robot 1 prevents redundant turn and can thus run through between obstacles. If the (swivel) turn has been repeated a given number of times in a zigzag movement, an escape motion from the deadlock state is commenced which includes a backward running of a predetermined distance and a (swivel) turn following the backward running.

17 Claims, 17 Drawing Sheets

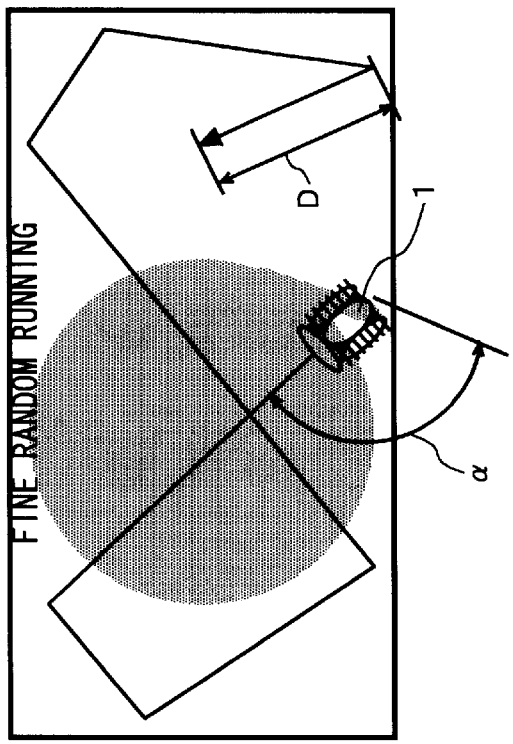
FIG. 6B FINE RANDOM RUNNING
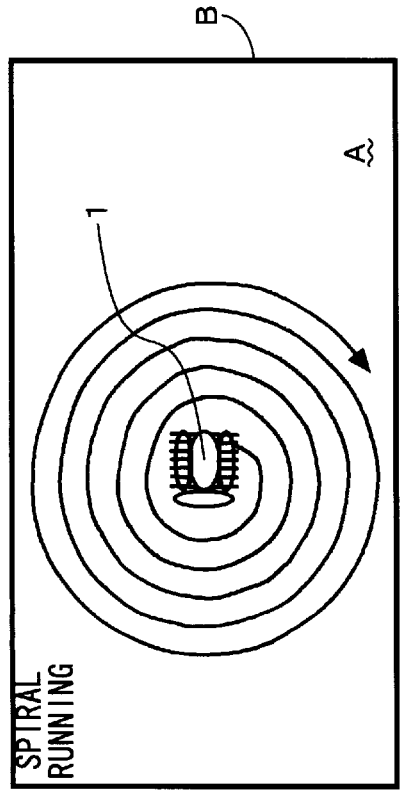
FIG. 6A SPIRAL RUNNING
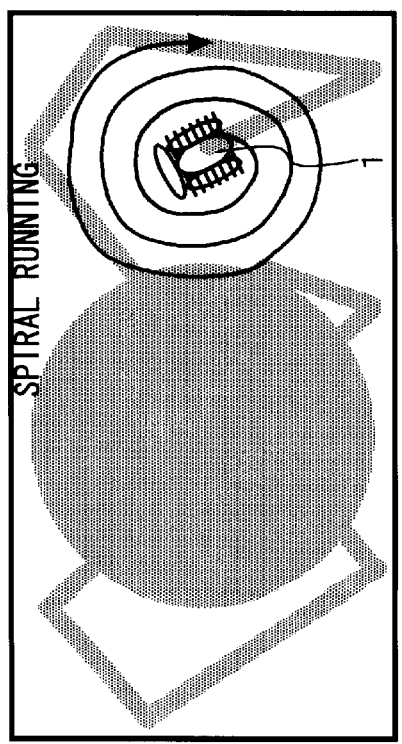
FIG. 6C SPIRAL RUNNING

FIG. 13

| SENSOR NAME | SENSOR DETECTION | MOTION SCHEME | PARAMETERS TRANSFERRED TO SUCCEEDING MOTION TO BE SELECTED | | | |
|---|---|---|---|---|---|---|
| | | | TREAD SPEED | | TURNING | |
| | | | INTRA-SIDE | OPPOSITE-SIDE | LEVEL | DIRECTION |
| 6SR | OVER 0.5m | STRAIGHT | HIGH | HIGH | — | — |
| | 0.3m – 0.5m | STRAIGHT (TURN) | MODERATE | VERY LOW | 2 | LEFT |
| | UNDER 0.3m | STRAIGHT (TURN) | LOW | PAUSE | 1 | LEFT |
| 6R | OVER 2m | STRAIGHT | HIGH | HIGH | — | — |
| | 1.5m – 2m | STRAIGHT (TURN) | MODERATE | LOW | 3 | LEFT |
| | 1m – 1.5m | STRAIGHT (TURN) | MODERATE | VERY LOW | 2 | LEFT |
| | 0.5m – 1m | STRAIGHT (TURN) | LOW | PAUSE | 1 | LEFT |
| | 0.3m – 0.5m | SWIVEL TURN | VERY LOW | VERY LOW | 0 | LEFT |
| | UNDER 0.3m | BACKWARD | VERY LOW | VERY LOW | — | — |
| 6DR | OVER 0.5m | STRAIGHT | HIGH | HIGH | — | — |
| | 0.3m – 0.5m | STRAIGHT (TURN) | VERY LOW | PAUSE | 1 | LEFT |
| | UNDER 0.3m | SWIVEL TURN | VERY LOW | VERY LOW | 0 | LEFT |
| 6MR | OVER 0.5m | STRAIGHT | HIGH | HIGH | — | — |
| | 0.3m – 0.5m | STRAIGHT (TURN) | VERY LOW | PAUSE | 1 | LEFT |
| | UNDER 0.3m | SWIVEL TURN | VERY LOW | VERY LOW | 0 | LEFT |
| 6SL | OVER 0.5m | STRAIGHT | HIGH | HIGH | — | — |
| | 0.3m – 0.5m | STRAIGHT (TURN) | MODERATE | VERY LOW | 2 | RIGHT |
| | UNDER 0.3m | TURN | LOW | PAUSE | 1 | RIGHT |
| 6L | OVER 2m | STRAIGHT | HIGH | HIGH | — | — |
| | 1.5m – 2m | STRAIGHT (TURN) | MODERATE | LOW | 3 | RIGHT |
| | 1m – 1.5m | STRAIGHT (TURN) | MODERATE | VERY LOW | 2 | RIGHT |
| | 0.5m – 1m | STRAIGHT (TURN) | LOW | PAUSE | 1 | RIGHT |
| | 0.3m – 0.5m | SWIVEL TURN | VERY LOW | VERY LOW | 0 | RIGHT |
| | UNDER 0.3m | BACKWARD | VERY LOW | VERY LOW | — | — |
| 6DL | OVER 0.5m | STRAIGHT | HIGH | HIGH | — | — |
| | 0.3m – 0.5m | STRAIGHT (TURN) | VERY LOW | PAUSE | 1 | RIGHT |
| | UNDER 0.3m | SWIVEL TURN | VERY LOW | VERY LOW | 0 | RIGHT |
| 6ML | OVER 0.5m | STRAIGHT | HIGH | HIGH | — | — |
| | 0.3m – 0.5m | STRAIGHT (TURN) | VERY LOW | PAUSE | 1 | RIGHT |
| | UNDER 0.3m | SWIVEL TURN | VERY LOW | VERY LOW | 0 | RIGHT |

# MOBILE ROBOT CONTROL DEVICE

BACKGROUND OF THE INVENTION

1. Field of the Invention

The present invention relates to a control device for a mobile robot and particularly, to a control device for a mobile robot which allows the robot to run through a narrow passage and/or between obstacles with a minimum of hunting and zigzag motion and a less number of turns and to escape from its deadlock state where the robot is stalled in a limited location such as a corner in a target area for the robot to run throughout.

2. Description of the Related Art

Mobile robots including a cleaner robot, a mower robot, a plasterer robot, and an agricultural sprayer robot are known which automatically run throughout a given area for accomplishment of its imposed task. For example, a cleaner robot is disclosed in Japanese Patent Laid-open Publication No. HEI 5-46246 which first runs about in a target room to be cleaned to map out a running or cleaning area through detection of the size and shape of the target room and the locations of obstacles in the room. Coordinates data produced by the mapping are then used for a mobile robot to clean the room while running in a zigzag pattern or a spiral pattern in which the radius of circling is gradually decreased in every turn. The robot includes contact sensors and supersonic sensors for detecting walls around it to determine its route and a distance meter for measuring the traveled distance to know the end of a circling motion. Also, another mobile robot for running around throughout the whole area of a given floor is disclosed in Japanese Patent Laid-open Publication No. HEI 5-257533.

Such conventional mobile robots are generally provided with a number of sensors of which outputs are used for acquiring the data of an area to be traveled and determining the operations to be performed for running through. More particularly, the outputs of the sensors are constantly transferred to a central controlling unit which in turn determines the controlling action for steering the robot at high accuracy on the basis of the sensor outputs. Driving actuators such as motors are controlled based on said determinations.

When the central controlling unit handles the outputs of all the sensors, its system should be sophisticated and its processing speed will be lowered. Such a lower processing speed may retard to take an averting action when encountering an obstacle such as a wall. Also, required are time for mapping, teaching, and settings of relevant thresholds and initial values for various kinds of controls, and skills for the settings.

Accordingly, the conventional mobile robots are so bulky in size and heavy in weight and costly that their applications will be limited. For example, the limited applications are known as transporting robots and cleaning robots in plants.

Not all robots have to run throughout the entirety of a target area at a higher accuracy but some robots are allowable to run throughout the area at a considerable degree of accuracy. Their routes and directions may not be critical. In some cases of a cleaning robot, for example, the area to be cleaned has not always to be covered in its entirety but some of the area can be remained uncleaned. Depending on their requirements, some mower robots must produce highly neat traces of mowed area and the others are expected to perform a mowing operation only at a substantial level.

SUMMARY OF THE INVENTION

It is an object of the present invention to provide a mobile robot device which allows the robot to run through a narrow passage and/or between obstacles with a minimum of hunting and zigzag motion and a less number of turns and to escape from its deadlock state where the robot is stalled in a limited location such as a corner in a target area for the robot to run throughout.

A robot according to the present invention, when its left and right side sensors detect obstacles at substantially the same time, compares two measurements of distance to the obstacles from the robot with each other and turns to a side where the measured distance is longer. Also, when a turning motion is selected in a direction opposite to the direction of the previous turning motion within a predetermined short length of time, its turning angle is set to be smaller than that of the previous turning motion.

According to the present invention, when a difference between the two distances measured by the left and right side sensors is smaller than a reference value, the turning motion is inhibited.

The robot of the present invention, upon detecting a hunting movement or a zigzag movement in which the turning motions are repeated to the opposite directions more than a predetermined number of times, straightly runs backward by a predetermined distance and then performs a (swivel) turn with its left and right wheels rotated in opposite directions with each other to escape its deadlock state.

BRIEF DESCRIPTION OF THE DRAWINGS

FIGS. 6A, 6B and 6C are schematic views showing a spiral pattern running for the robot according to the present invention;

FIG. 13 is a run parameter table showing the relation between run parameters and outputs of the sensors;

DETAILED DESCRIPTION OF THE PREFERRED EMBODIMENTS

Figure 1:
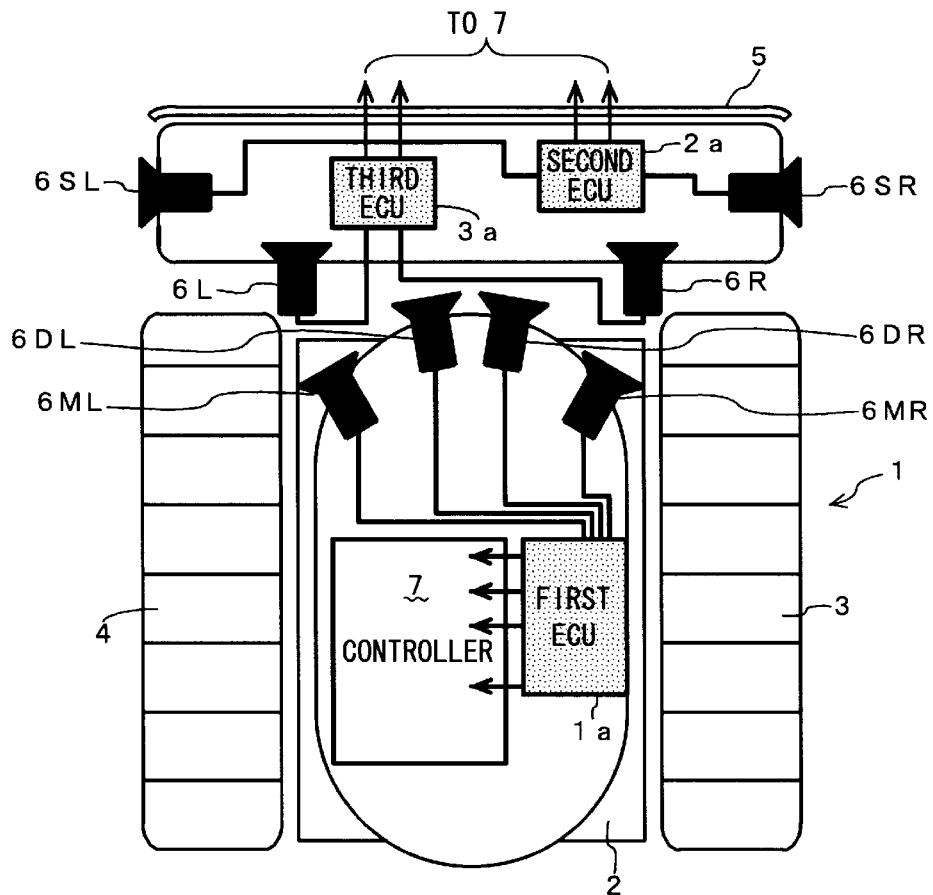
FIG. 1 is a schematic view showing a construction of a robot according to one embodiment of the present invention.

The present invention will be described in more detail referring to the accompanying drawings. FIG. 1 is a schematic view of an outline structure of a mobile robot provided with a controller according to one embodiment of the present invention. As shown, the robot 1 operates forward running, backward running, pausing, and turning motions with a pair of caterpillar treads 3 and 4 mounted on both sides of its body 2 and controlled respectively. Each tread is joined to a driving motor not shown. The turning motion includes pivot turn with one of the caterpillar treads 3 and 4 being driven while the other being halted and swivel turn with the two caterpillar treads 3 and 4 being driven in opposite directions each other. The body 2 has a bumper 5 mounted to the front thereof and accompanied with a contact sensor (not shown) which senses a pressure upon touching an obstacle and thus detects the presence of the obstacle.

The robot 1 also includes eight supersonic sensors for detecting an obstacle without contact: sensors 6R and 6L mounted on the front side, sensors 6ML and 6MR mounted on the left and right front ends, sensors 6DL and 6DR mounted on the front lower side, and sensors 6SL and 6SR mounted on the left and right sides of the robot 1. Those sensors are preferably of a supersonic type and may be of any other type such as optical sensors. The sensors 6R, 6SR, 6MR, and 6DR detect obstacles on the right side of the body 2 while the sensors 6L, 6SL, 6ML, and 6DL detect the same on the left side. The detection signals from the right and left side sensors produce the parameters for rotation of the intra-side and the opposite side treads 3 and 4, respsctively.

For simplicity of the description, the eight sensors 6R, 6L, 6MR, 6ML, 6SR, 6SL, 6DR, and 6DL will be simply called a supersonic sensor group 6 when all are inclusively referred to. The sensors 6DR, 6DL, 6MR, and 6ML are connected to a first ECU 1a, the sensors 6SR and 6SL to a second ECU 2a, and the sensors 6R and 6L to a third ECU 3a, respectively. The ECUs all are connected to the controller 7 which will be described later and arranged to control the driver circuit for the sensor group 6 and the inputting and outputting of the detection signals from the sensor group 6.

In addition to the above mentioned obstacle sensors, additional sensors (not shown) are provided for detecting the number of revolutions of the treads 3 and 4. The revolution sensors may be implemented, for example, by encoders directly linked to the two driving motors. A pulse output of each encoder is used as indicative of the number of revolutions.

Figure 2:
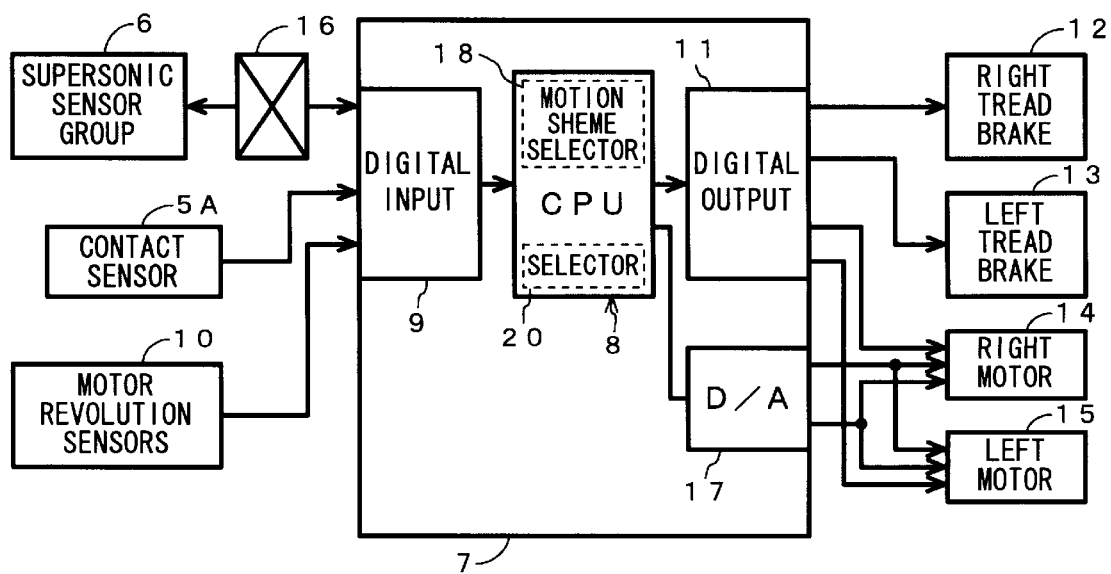
FIG. 2 is a block diagram of a hardware structure of a controller according to one embodiment of the present invention.

A hardware arrangement of the controller 7 in the present embodiment will now be described referring to the block diagram of FIG. 2. The controller 7 includes a CPU 8 and a digital input 9 which is connected to the supersonic sensor group 6 via a supersonic sensor driver circuit 16 (including the first through the third ECUs 1a, 2a and 3a) for controlling the input and output of sensor signals. Also, the digital input 9 is connected to a contact sensor 5A mounted on the bumper 5 and motor revolution sensors (encoders) 10 for the motors driving the left and right treads 3 and 4 as well as the supersonic sensor group 6. Accordingly, the detection signals of the supersonic sensor group 6, the contact sensor 5A, and the revolution sensors 10 are transmitted via the digital input 9 to the CPU 8.

The CPU 8 is connected via a digital output 11 to a right tread (electromagnetic) brake 12, a left tread (electromagnetic) brake 13, a right tread motor 14 (referred to as a right motor), and a left tread motor 15 (referred to as a left motor). Instruction signals determined through the respective processes in the CPU 8 are thus supplied via the digital output 11 to the right tread brake 12, the left tread brake 13, the right motor 14, and the left motor 15, respectively. The right motor 14 and the left motor 15 are fed with the instruction signals for steering. Also, the instruction signals for motor revolution speed from the CPU 8 are transferred via a D/A converter 17 to the right motor 14 and the left motor 15.

In this arrangement, the CPU 8 are responsive to the inputs from the supersonic sensor group 6 and the contact sensor 5A (referred all-inclusively to as "sensors" hereinafter) for determining the action of a drive system including the right motor 14 and the left motor 15. The forward running, backward running, pausing, and turning of the robot are controlled as the functions of their corresponding modules by the CPU 8 independently. While the processes of inputs from the sensors and the generation of motion schemes are being conducted constantly, the forward running motion only is enabled in a normal mode with the swivel turn, pausing, and backward running motions maintained in a sleep state. The turning motions except the swiveling are controlled by a forward running control module.

Figure 3:
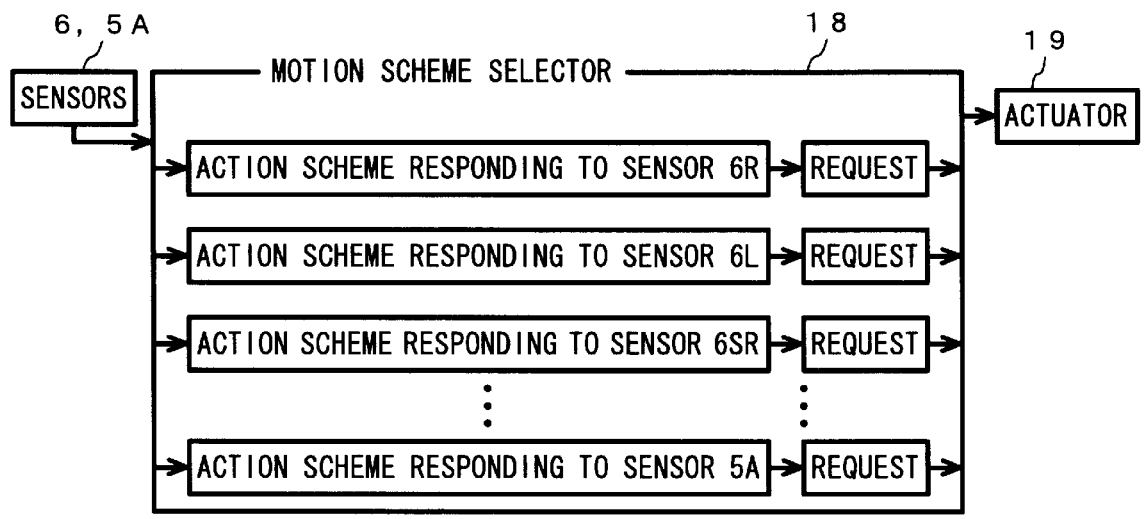
FIG. 3 is a schematic diagram showing the process system for selecting a motion scheme.

The CPU 8 includes a motion scheme selector 18 for assigning the robot to do one of predetermined motions in conditioned response to the inputs from the sensor group 6. FIG. 3 is a schematic view showing a system of process actions in the motion scheme selector 18. As shown, the motion scheme selector 18 has a multi-stage arrangement connected to the sensors 6 and 5A for generating action schemes and their requests in response to the outputs of the sensors and selects one of the requests as its instruction signal. The instruction signal thus selected is fed to the drive system (an actuator) 19 for controlling the right tread brake 12, the left tread brake 13, the right motor 14, the left motor 15 and others. As mentioned above, the instruction signals of the action scheme generated in response to the outputs of the sensors are accumulated and used in a combination to demonstrate the comprehensive action of the robot.

Figure 4:
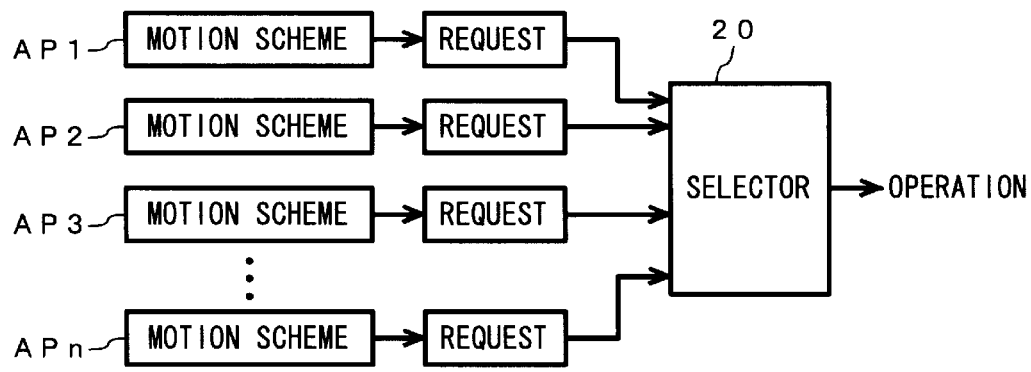
FIG. 4 is a block diagram showing the selection of the motion scheme.

In this embodiment, it is designed for not directly performing the action schemes generated responding to the outputs of the sensors but ranking the action schemes by their priority under predetermined rules and then performing a sequence of the action schemes starting from the highest priority one. FIG. 4 is a block diagram showing a process of motion detection in the embodiment. When the action schemes AP1, AP2, . . . APn and their requests have been generated, a highest priority scheme which is to prevent a collision against a wall is selected by a selector 20 from the action schemes AP1, AP2, . . . APn. The highest priority action scheme in the embodiment is to run backward. The second priority is to swivel at the site and the pivot turn, sharp turn, and slow turn follow in this order. The pivot turn, sharp turn, and slow turn are categorized in the forward running and distinguished from each other by difference of the speed between the left and right treads 3 and 4.

For example, when the action scheme is selected for turning slowly at a moderate speed to the right with an angle θ, the scheme driving the right tread 3 at V1 rpm and the left tread 4 at V2 rpm (V2>V1) is executed. The priority for each action scheme is determined in response to the outputs of the supersonic sensor group 6, hence excluding a stop control on the basis of the obstacle detection output of the contact sensor.

It should be noted that in a backward running of the motion schemes, the robot runs backwards for a predetermined duration of time and in general, the backward running is promptly shifted to the swivel turn. During a normal forward running, the two motors 14 and 15 receive the same instruction of RPM. It is preferable for improving the accuracy of the forward running to compensate the instructions for the treads 3 and 4 on the basis of the output pulse signals from the revolution sensors 10 so that the left and right motors 14 and 15 rotate at the same speed. The pausing motion is conducted by changing the revolution speed to zero and actuating both the right and left tread brakes 12 and 13. If necessary, regenerative braking may be used in the pausing motion.

Figure 5A:
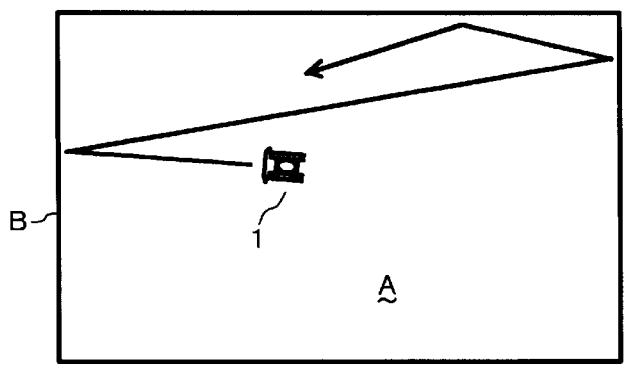
FIGS. 5A and 5B are schematic views showing a basic running pattern for the robot according to the present invention.
Figure 5B:
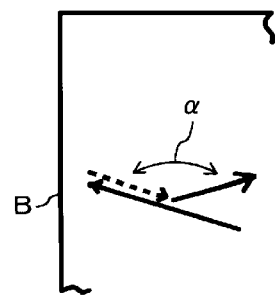

Patterns of running of the robot according to the present invention which are combinations of the above motions will now be explained. The description starts with a random running which is a basic running pattern of the robot 1. In the random running pattern, the robot 1 usually runs straight forward in an area A defined by boundaries or walls B as shown in FIGS. 5A and 5B. When the robot 1 reaches at a setting distance from one of the walls B, it pauses and turns through a predetermined angle (or may be moved backward a distance before turning). Then, the robot 1 starts again running straightly towards the other wall B. The angle α of turning (FIG. 5B) in the proximity of the wall B may be determined at random selection in each turning motion.

We, the inventors, have found through a series of simulations that there is an optimum turning angle α for allowing the robot 1 to run not into the regions where the robot 1 has already passed but across difference regions to cover more portions of the area A. The optimum angle α is 135 degrees. The random running pattern with the turning angle α of 135 degrees will be referred to as a fine-tuning random running pattern hereinafter.

It is also found by us that a combination of the fine-tuning random running pattern and a spiral pattern running motion further improves the efficiency of working operation in which when the random running (preferably, the fine-tuning random running with 135-degree turning) has repeated a predetermined number of times, the running is switched into a spiral motion. Such the combination of the random running and the spiral running will be referred to as spiral/random running pattern hereinafter.

The spiral/random running pattern is now explained in more detail. Referring to FIG. 6A, the robot 1 is first placed at an appropriate spot in the area A. It is assumed that the area A has a rectangular shape defined by four walls B. The initial placing of the robot 1 is arbitrary. The robot 1 then starts running in a spiral pattern as shown in FIG. 6A. In the spiral running, the radius of circling is gradually increased in turns. This motion is controlled by a decision which is different from those for the forward running, the swivel turning, and backward running and will be explained later in more detail referring to FIG. 14. In brief, the speeds of the two treads 3 and 4 or the revolution speeds of the two motors 14 and 15 are calculated so that there are no gaps between any two adjacent circling tracks of the robot 1 and then updated for increasing the radius of circling in turns. As the spiral of the trace is enlarged, the robot 1 comes close to one of the walls B and its arrival at substantially a predetermined distance from the wall B is detected with the supersonic sensor group 6. This allows the robot 1 to stop the spiral running and start a (preferably fine-tuning) random pattern running for traveling to a location where another spiral running is to be commenced (FIG. 6B). The shaded areas in FIGS. 6B and 6C represent the trace of the robot 1 or the regions which have been covered by running of the robot 1.

The intermediate action from canceling the current spiral running and to starting another spiral running is as follows. When the robot 1 comes close to the wall B and any supersonic sensor 6 detects close about the predetermined distance from the wall B, the turning motion explained with reference to FIGS. 5A and 5B starts. For example, when its current distance from the wall B is smaller than the predetermined distance at the moment of the detection of the wall B, the robot 1 immediately stops its forward running, moves backward a predetermined distance if required, and performs a swivel turn through 135 degrees (or any other desired angle) before resuming a forward running to move away from the wall B. Should the current distance from the wall B at the time of detection be greater than the predetermined distance, the robot 1 may sharply turn with a smaller angle to steer clear of the wall B.

Similarly, when the robot 1 has turned away from the wall B, run forward, and arrived close to another wall B, its running direction will be changed by conducting the backward running and the swivel, pivot or simple turning. After the turning at the wall B is repeated a predetermined number of times N, the robot 1 runs away for a specific duration of time T (or by a specific distance D) from the wall B where the latest turning motion has been performed and stops its forward running motion. Then, the robot 1 starts again another spiral pattern running motion (FIG. 6C) and the above mentioned actions are repeated thereafter. For simplicity of the description, the distance D from the latest wall B is substituted by the time T. A designer or an operator of the robot 1 may, however, select either the distance D or the time T as a parameter for use in the controlling operation.

Figure 7A:
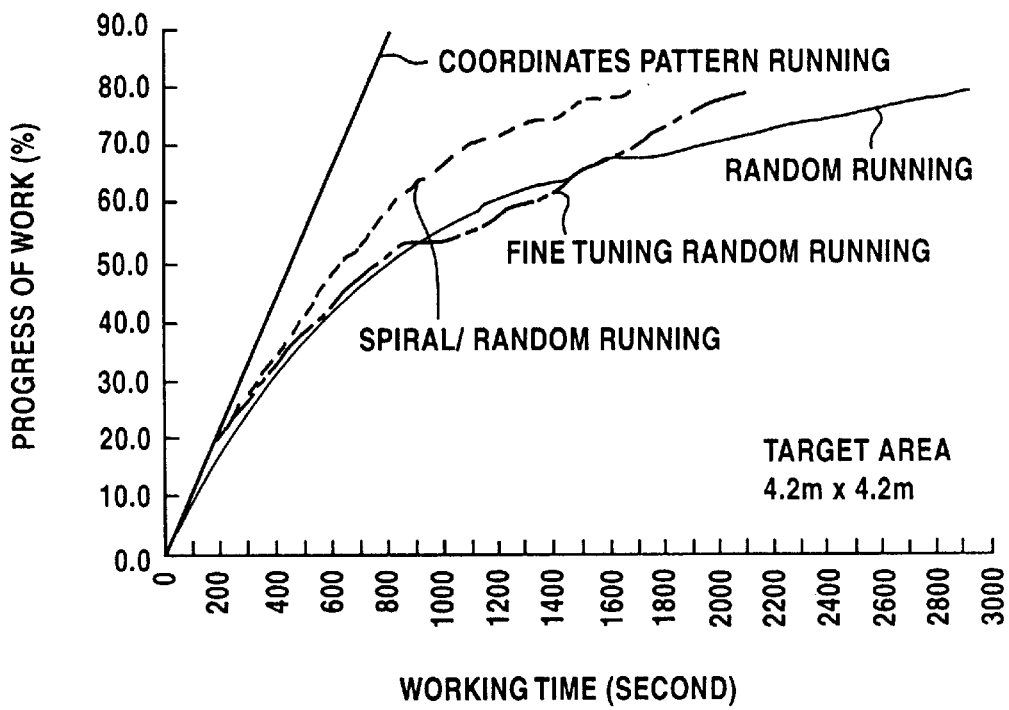
FIGS. 7A and 7B are diagrams of a result of simulation showing the relation between time and progress of work using various parameters of the running pattern.
Figure 7B:
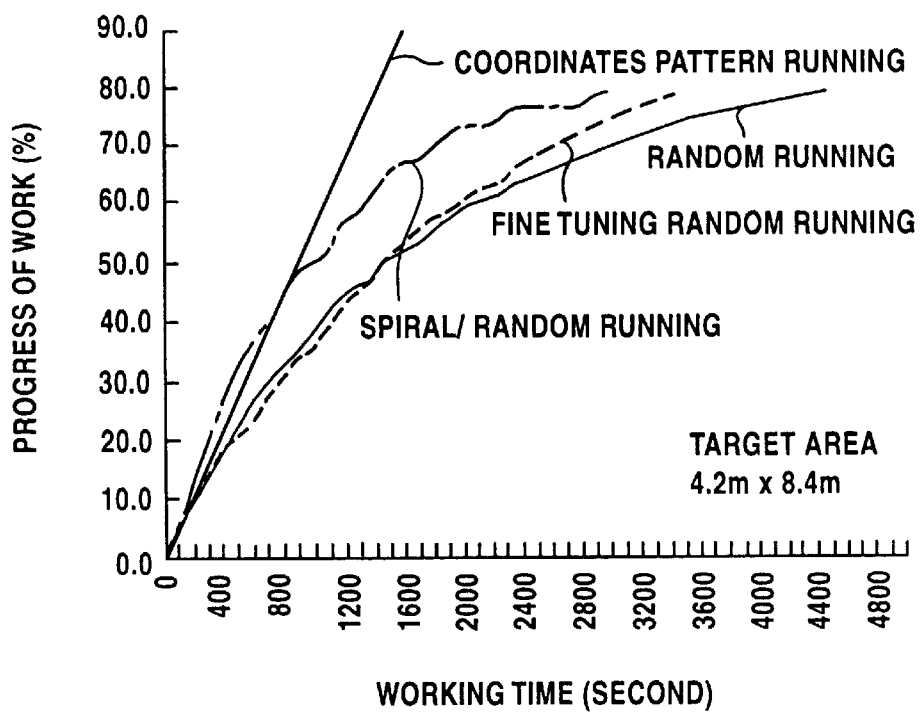

FIGS. 7A and 7B are graphs showing the relation between a working time and a progress of work or a coverage of the target area conducted by a robot 1 in our simulations. The vertical axis represents a rate (%) of the target area covered by running of the robot 1 and the horizontal axis is a working time from the start. It is now noted that the size and shape of the robot 1 is equivalent to a circle of 20 cm in diameter and the running speed of the robot 1 is 13 cm/second. The target area is a square of 4.2 m by 4.2 m in FIG. 7A and is rectangular of 4.2 m by 4.8 m in FIG. 7B.

In FIGS. 7A and 7B, a coordinates pattern running means a running motion along a path predetermined on a coordinate plane so that the robot 1 can cover the entirety of the target area, in which the area coverage rate is increased lineally proportional to an elapse of time. In comparison, the other pattern running motions including the spiral/random pattern running exhibit an attenuating increment of the area coverage and may find it very difficult to cover the entirety of the area. Assuming that the area coverage of 80% is acceptable, three of the pattern running motions except the coordinates pattern running motion are compared in the efficiency of 80% coverage per a spent time. It is apparent that the spiral/random pattern running motion covers 80% of the target area in the shortest time.

The number of turning times N and the forward running time T (or the distance D) must be previously set to desired values. If the number of times N is too less, the spiral running to be resumed is too close to the preceding spiral running area hence increasing an overlap region and declining the working efficiency. When N is too large, on the contrary, the time (or the distance) of forward running is too much increased thus lowering the working efficiency. If the time T is excessively short or long, the spiral running resumes near the latest wall B and may quickly come close to another wall B hence declining the working efficiency.

Figure 8A:
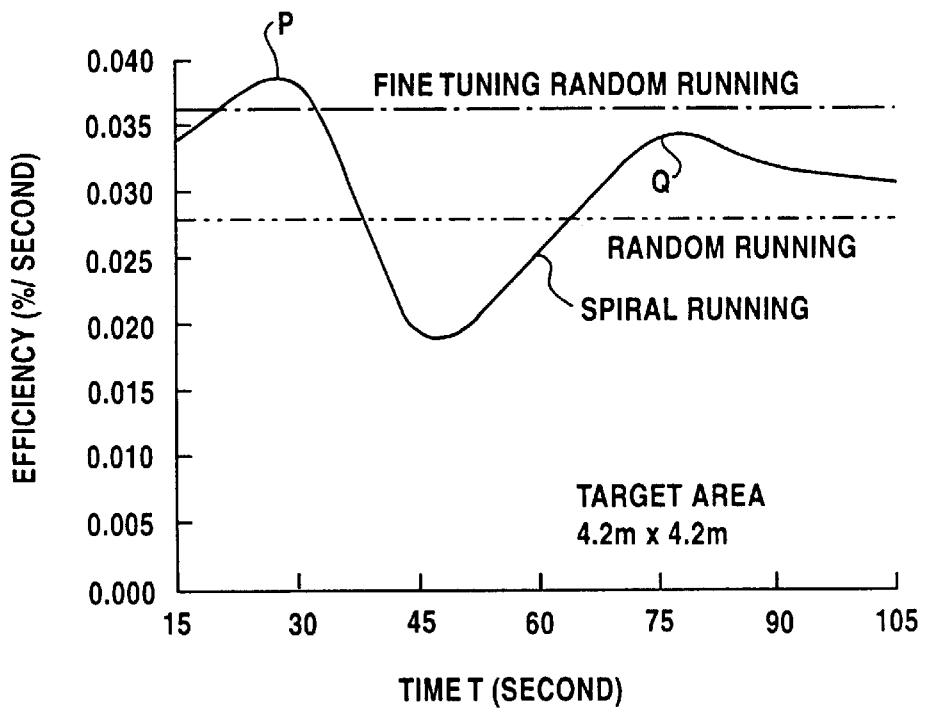
FIGS. 8A and 8B are diagrams of a result of simulation showing the relation between working efficiency and time T of running time.
Figure 8B:
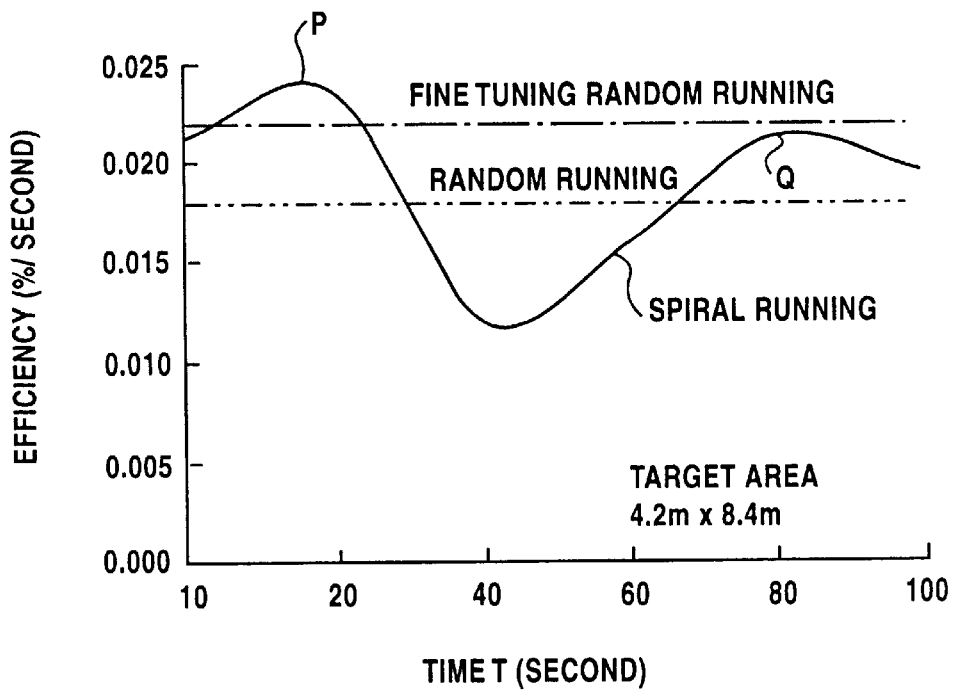

Optimum lengths of the time T are found through experimental simulations as shown in FIGS. 8A and 8B. The vertical axis represents the working efficiency and the horizontal axis is the time T (seconds) after the swivel turning motion. The working efficiency is defined as a coverage (%) of the target area per second and is calculated on the basis of the time spent for covering 80% of the target area (FIGS. 7A and 7B).

In those simulations, like the previous experiments, the area to be covered by the robot 1 is 4.2 m×4.2 in FIG. 8A and 4.2 m×8.4 m in FIG. 8B. It is again noted that the size and shape of the robot 1 is a circle of 20 cm in diameter and the running speed of the robot 1 is 13 cm/second. As apparent from FIGS. 8A and 8B, there are two (peak) points P and Q where the working efficiency is extremam for the time T. It is hence desired that the time T is determined at the point P where the working efficiency is maximum with shorter time T. For the purpose of comparison, levels of the working efficiency in the random pattern and fine-tuning random pattern running motions are also shown.

Figure 9A:
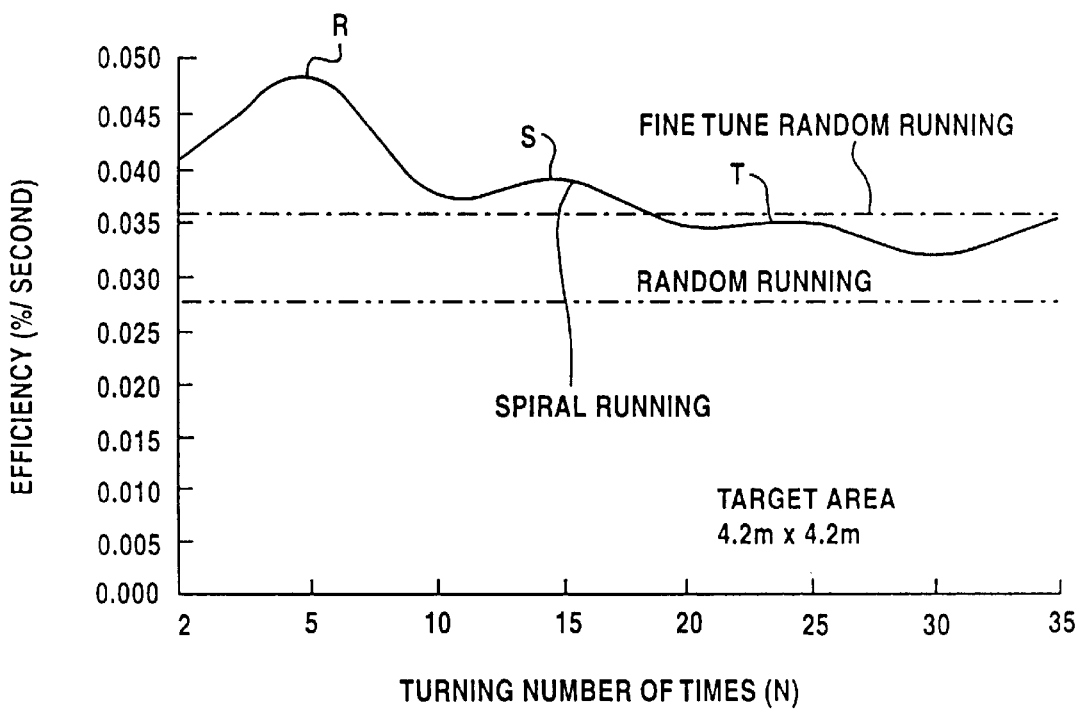
FIGS. 9A and 9B are diagrams of a result of simulation showing the relation between working efficiency and the number of times N of turning or revolving motions.
Figure 9B:
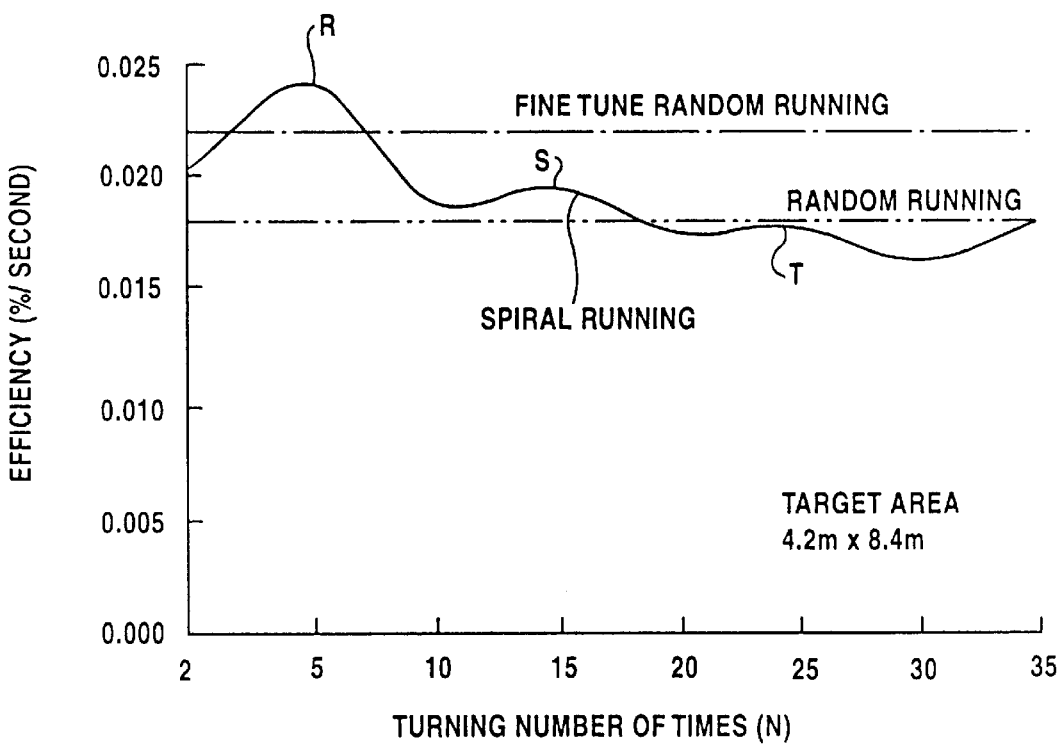

FIGS. 9A and 9B illustrate optimums of the turning number of times N found through the simulations. The vertical axis represents the working efficiency and the horizontal axis is the turning number of times N. The size of a target area, the projected area of the robot 1, and the running speed of the robot 1 are identical to those shown in FIGS. 8A and 8B. As apparent, (peak) optimum points R, S, T., of the working efficiency are specified as the number of times N is varied. When N is five, the working efficiency is maximum in each case where the target area is large or small. For comparison, levels of the working efficiency in the fine-tuning random pattern and random pattern running are shown.

In the simulations for determining the optimum of the time T and the number of times N, it has been found that there is no interference each other between the time T and the number of times N. This permits the determination of the optimum of one of the time T and the number N to be followed by the determination of the optimum of the other. In this embodiment, the optimum of the time T and then, the optimum of the number of times N are decided.

Figure 10:
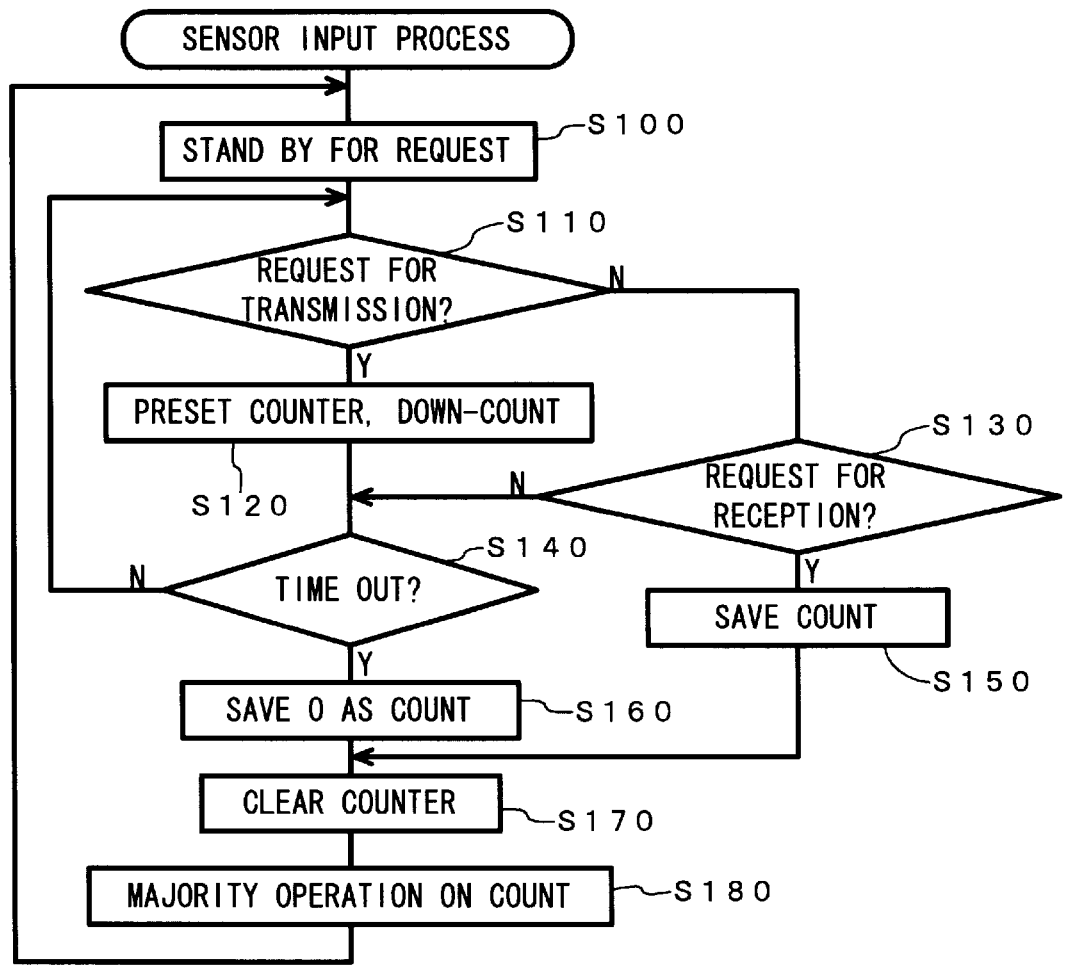
FIG. 10 is a flowchart of processing inputs from supersonic sensors.

The action of the controller 7 will now be explained referring to the flowcharts. The explanation starts with processing inputs from the supersonic sensor group 6. As shown in FIG. 10, Step S100 stands by for receiving a request from the supersonic sensor group 6 (or the supersonic sensor driver circuit 16). When the request is received, the procedure goes to Step S110 where it is examined whether or not the request indicates transmission of supersonic waves or more specifically, the CPU 8 is informed of transmission of supersonic waves, from the supersonic sensor 6. When the request demands the transmission of supersonic waves, the procedure moves to Step S120 for presetting the counter with a predetermined value and starting the counter counting down. The predetermined value preset is indicative of a predicted longest duration of time in which reflected waves will be received by the supersonic sensor 6.

It is then examined at Step S130 whether or not a request of signal reception is issued, or more specifically, the supersonic sensor 6 receives the reflected waves. If the request of signal receipt is not issued, the procedure goes to Step S140 where it is checked whether or not the time preset is up, or more specifically, the counter is counted down to zero. When the time is not up, the waiting for the request of the signal receipt continues until the time is up. When it is judged at Step S130 that the request of signal receipt has been released, the procedure moves to Step S150 for saving a current count of the counter value. When the count has been saved, the counter is cleared at Step S170. If the request of signal receipt is not received before the time is up, the current count is saved as 0 at Step S160 and the counter is cleared at Step S170. At Step S180, majority operation may preferably be carried out for improving the reliability of the count saved at Step S150. The majority operation will be explained later in more detail referring to FIG. 17. The count saved during the processing of inputs from the supersonic sensors 6 is referred to as a distance count hereinafter.

Figure 11:
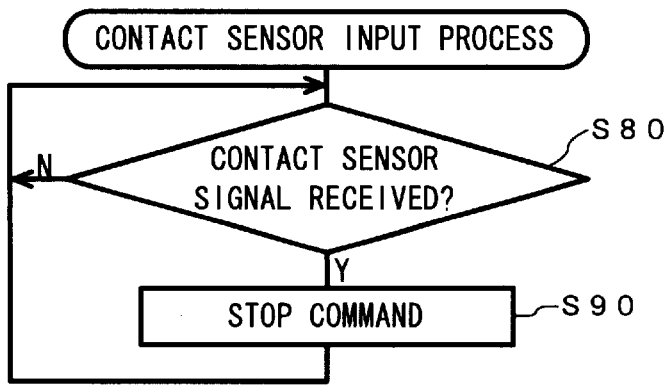
FIG. 11 is a flowchart of processing inputs from contact sensors.

FIG. 11 is a flowchart of processing an input from the contact sensor 5A. When it is determined at Step S80 that the detection signal from the contact sensor 5A is received, the procedure goes to Step S90 where a command for stopping the running of the robot 1, or an instruction of shifting the revolution speeds of the two motors 14 and 15 to zero is delivered and simultaneously, the right and left brakes 12 and 13 are actuated. The processing of inputs from the contact sensor 5A may be executed by the timer interruption at intervals of, for example, 10 milliseconds.

The controlling operation in response to the output signals of their respective sensors is explained. Referring to a general flowchart of FIG. 12, an instruction for starting the spiral running is given at Step S1. The controlling of the spiral running will be described later in more detail referring to FIG. 14. At Step S2, the distance count which is a result of the processing of inputs of the supersonic sensors is requested. Then, the processing of an input from the contact sensor is carried out at Step S3 (actually, it is done by the timer interruption, as mentioned above).

This is followed by Step S4 where it is examined whether the spiral running is under way or not. In an initial stage, since the spiral running is enabled by the spiral motion starting instruction (Step S1), Step S4 judges yes. When yes, the procedure advances to Step S5 where it is examined whether the spiral running is to be continued or not. This step for examining the continuation of the spiral running incorporates judging, on the basis of the distance count saved in the supersonic sensor inputs processing, whether or not the robot 1 is close to the predetermined distance from any wall B, or whether or not the current spiral running has to be canceled and to move to a different location where another spiral running is started.

In this embodiment, the current spiral running is canceled when the robot 1 reaches 30 cm or less from the wall B. At Step S6, it is decided from the result of Step S5 whether the spiral running is canceled or not. If not, the procedure returns to Step S2.

When the decision is affirmative at Step S6, the procedure goes to Step S8 for selecting the succeeding motion. After the spiral running has been canceled, the backward running commonly follows. At that time, the robot 1 is so close to the wall B that its normal turning may easily result in collision against the wall B. Therefore, the backward running is generally selected first, then it is commonly followed by the swivel turn and the (straight) forward running.

When the backward running is selected at Step S8, the procedure moves to Step S9 where it is examined whether the current motion is backward or not. The motion is not backward immediately after the spiral running is canceled and then, it is judged not. Step S10 follows where the pausing motion of the robot is called for a moment (in 20 to 30 ms) and the procedure goes to Step S11. If it is judged yes at Step S9, the procedure skips Step S10 and moves to Step S11. The backward running process is requested to be commenced at Step S11 as will be explained later in more detail. When the backward running is commenced in response to the request, it takes over the spiral running and "no" is established at Step S4 before the procedure goes to Step S7. As the spiral running has been canceled, the decision at Step S7 is used at Step S8 for selection of the succeeding motion.

At Step S7, the succeeding motion is selected or decided according to the distance count produced by the supersonic sensor group 6 (a succeeding motion determination). The succeeding motion determination incorporates selection of the succeeding motion for the robot through examining run parameters listed in the run parameter table of FIG. 13. Selections of the parameters in the table of FIG. 13 are designated corresponding to the detection outputs of the sensors which indicate the distances to the wall and transmitted for starting a desired motion. The parameters include the speeds of the two treads, the degree of turning, and the direction of turning.

The speed of each tread of the robot 1 is classified into four levels: very low speed (0.5 km/h), low speed (1.0 km/h), moderate speed (2 km/h), and high speed (3 km/h). The turning degree is classified into four levels: slow turn (through 30 degrees, Level 3), sharp turn (through 60 degrees, Level 2), pivot turn (turn on pivot with one tread held, Level 1), and swivel turn (two treads turned in opposite directions each other, Level 0). The turning motion is also categorized into the left turn and right turn.

When the wall is detected by the supersonic sensors 6SR, 6R, 6DR, and 6MR mounted on the right half of the robot 1, the left turn is called. When the wall is detected by the supersonic sensors 6SL, 6L, 6DL, and 6ML mounted on the left half of the robot 1, the right turn is selected.

The speed parameter for each tread of the robot 1 is categorized in two: speed of the sensor-side or intra-side tread and speed of the opposite-side or other tread. For instance, two parameters of the tread speed for the (right) motor of the right tread and the (left) motor of the opposite or left tread are provided on the basis of the detection output of the sensor 6R on the right side. Since a number of the parameters are usually generated corresponding to the detection outputs of all the sensors 6, their selection to be actually used is governed by a predetermined rule. The table of FIG. 13 has a general rule, according to the present invention, which gives the priority to the slower speeds with an exception in that the very low speed is selected when the "pause" parameters are assigned to both the motors 14 and 15.

For example, when the distance count of the right front sensor 6R exhibits the distance of substantially 0.5 m to 1 m, the "low speed" parameter is assigned to the intra-side or right motor and the "pause" parameter is assigned to the opposite-side or left motor. In addition, the control to be activated is the turning in which the turning level parameter is "1" for the pivot turn and the turning direction parameter is "left". When the distance count of the left front sensor 6L shows the distance of 1 m to 1.5 m at the same time, the parameters are given of "moderate speed" for the intra-side or left motor, "very low speed" for the opposite side or right motor, "turning" for the control to be activated, "2" of the turning level, and "right" of the turning direction.

Those parameters are then reviewed for adopting a slower speed. As the result, the "very low" parameter is given to the right motor while the "pause" parameter is given to the left motor, hence causing the robot 1 to turn on the pivot to the left at the very low speed.

As another example, the distance of 1.5 m to 2 m from the distance count of the right sensor 6R defines the "moderate speed" parameter for the intra-side or right motor and the "low speed" parameters for the opposite or left motor. Similarly, the distance of 1.5 m to 2 m from the distance count of the left sensor 6L defines the "moderate speed" parameter for the left motor and the "low speed" parameters for the right motor. After reviewing those parameters, the "low speed" parameter is assigned to both the right and left motors thus allowing the robot 1 to run straight forward at the low speed.

As a further example, while the robot 1 runs straight forward to the wall to meet at right angles, the detection outputs of the two sensors 6L and 6R are always the same. This causes the robot 1 to slow down its running speed as it comes close to the wall, stop the running at last, then perform the backward motion and the swivel turn, and finally, run away from the wall.

Return to FIG. 12, after the swivel turn is selected at Step S8 from a result of the succeeding motion determination at Step S7, the procedure goes to Step S12. It is examined at Step S12 whether the swivel turn is under way or not. In the beginning, it is judged not and the procedure advances to Step S13 for instant pausing (for about 20 to 30 ms). Then, an instruction for starting the swivel turn is given at Step S14. In succeeding cycles of the procedure, it is judged yes at Step S12 and the procedure goes to Step S15 for starting an escape control mode according to the present invention. If the robot 1 moves into a corner of the working area, it may find difficult to escape from the corner only with a common combination of the backward running motion and the swivel turn. In that case, the escape control mode is called in the course of the swivel turn. The escape control mode will be explained later in more detail with reference to FIGS. 21–24.

When the forward running is selected at Step S8 after the swivel turn through a specific angle (e.g. of 135 degrees), the procedure goes to Step S16 and Step S17 for instant pausing (for about 20 to 30 ms), Step S18 for prevention of hunting according to the present invention, and Step S19 for issuing an instruction of starting the forward running. In response to the instruction of starting the forward running, the robot 1 runs straight forward and when it comes close to the predetermined distance from another wall, its succeeding motion is determined from the distance count of the sensors. In the hunting prevention process according to the present invention, when both the left and right side sensors detect obstacles at a short interval of time, their measurements of distance to the obstacles are compared with each other to determine the speed of rotation of the left and right wheels for turning towards the obstacle to which the distance is longer. It will be explained later in more detail with reference to FIGS. 18–20.

Figure 12:
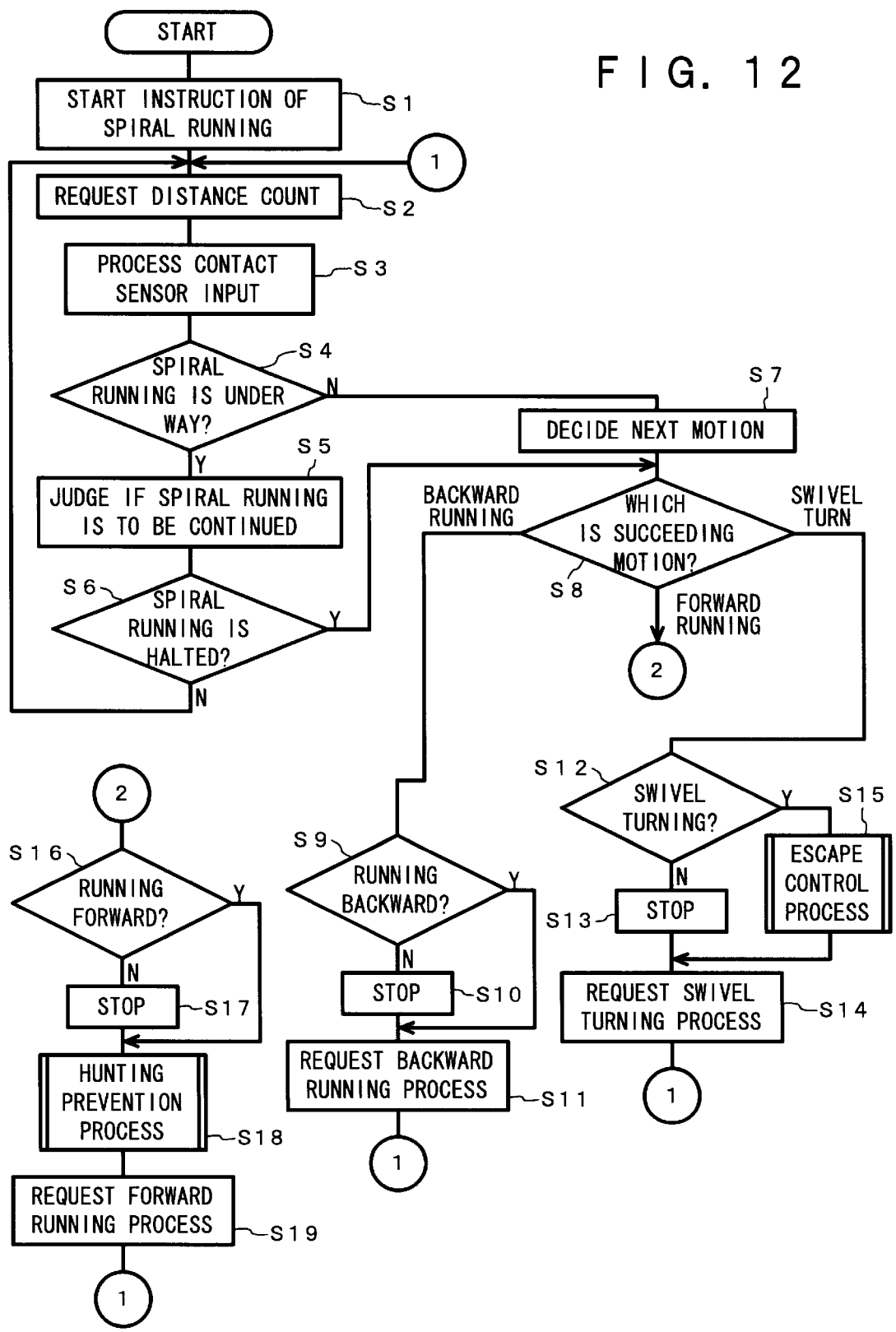
FIG. 12 is a flowchart showing motion selection or determination in the spiral pattern running.

The operation of the control modules in response to the detection outputs of the sensors will be now explained. The spiral running of the robot 1 is commenced when the robot begins to run for working operation as described above with referring to FIG. 12, and when, as mentioned previously with FIGS. 6A to 6C, the time T has elapsed after the last one of the N times of the swivel turnings conducted during the random running in which the robot 1 changes its running direction upon detecting the wall. In the beginning of a working operation, the spiral running process is started as commanded by the operator at Step S1 (FIG. 12). On the way, the commencement of the spiral running is requested by an instruction produced in a swivel turning process module (at Step S33 in FIG. 15) after the swivel turning has been carried out N times. The following description concerns the spiral running started by the commence instruction produced in the swivel turning process module.

Figure 14:
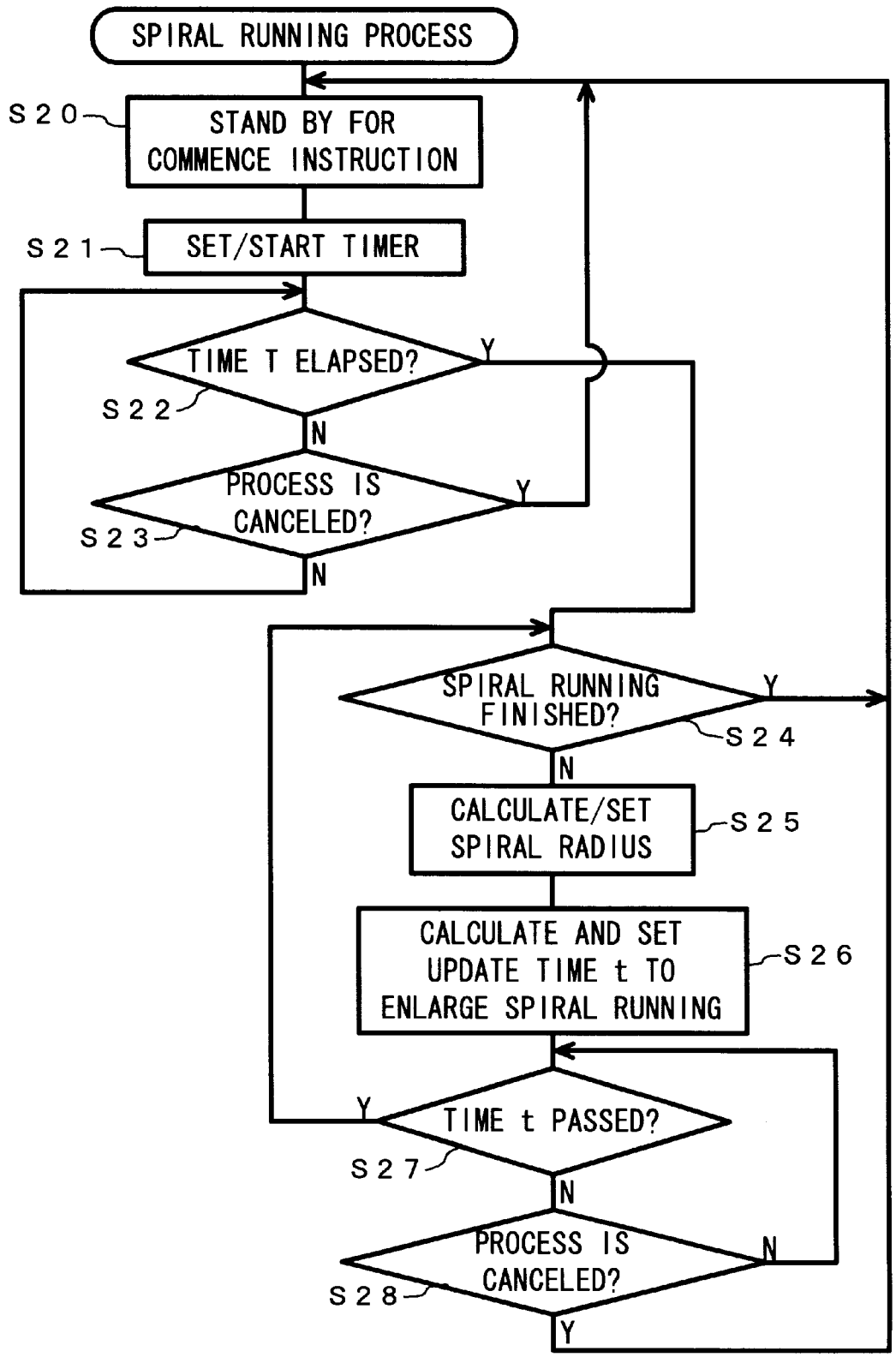
FIG. 14 is a flowchart showing control of the spiral pattern running.

Referring to FIG. 14, Step S20 stands by for receiving the instruction of starting the spiral running from the swivel turn control module (Step S33). More particularly, the procedure stands by the issuance of the instruction from the swivel running control module after the swivel turn has been repeated N times. Upon receiving the instruction, the time is set to the time T (e.g. 26 seconds), from the last of the N swivel turns to the start of the spiral running, and is started at Step S21. The instruction for starting the spiral running is released at substantially the moment when the last or N-th swivel turning motion starts up (at Step S33 in FIG. 15). The time T at Step S21, therefore, comprises a period for the backward running just before the swivel turn and a period for the swivel turn itself (Step S35 in FIG. 15). It is then examined at Step S22 whether or not the time T is elapsed. When so, the procedure advances to Step S24. Before the time T ends up, it is examined at Step S23 whether the cancel of the operation is requested or not. If the cancel of the operation is requested before the end of the time T, the procedure moves back to Step S20 for stand-by.

At Step S24, it is judged whether or not the spiral running is finished. When the distance from the robot 1 to the wall or obstacle which is found on the basis of the distance count of the sensors is found less than the predetermined distance, or when the detection output of the contact switch 5A produces a stop signal, it is then judged yes at Step S24. Then, the procedure returns back to Step S20. If not, Step S25 follows. At Step S25, the speeds of the two treads 3 and 4 for determining the size of a spiral or the radius of the turning motion are calculated and set. As both the motors 14 and 15 are loaded with signals for realizing the calculated speeds of the two treads 3 and 4, hence realizing the spiral running.

At Step S26, the time t for updating the speeds of the two treads 3 and 4 is calculated to smoothly enlarge the spiral locus of the robot and set in the timer which is then started up. It is examined at Step S27 whether the time t has passed or not. When so, the procedure returns back to Step S24. At Step S28, it is also examined whether the cancel of the operation is requested or not. When not, Steps S27 and S28 are repeated until the time t is ended up. If yes in Step S28, the procedure goes back to Step S20 and stays in stand-by.

Figure 15:
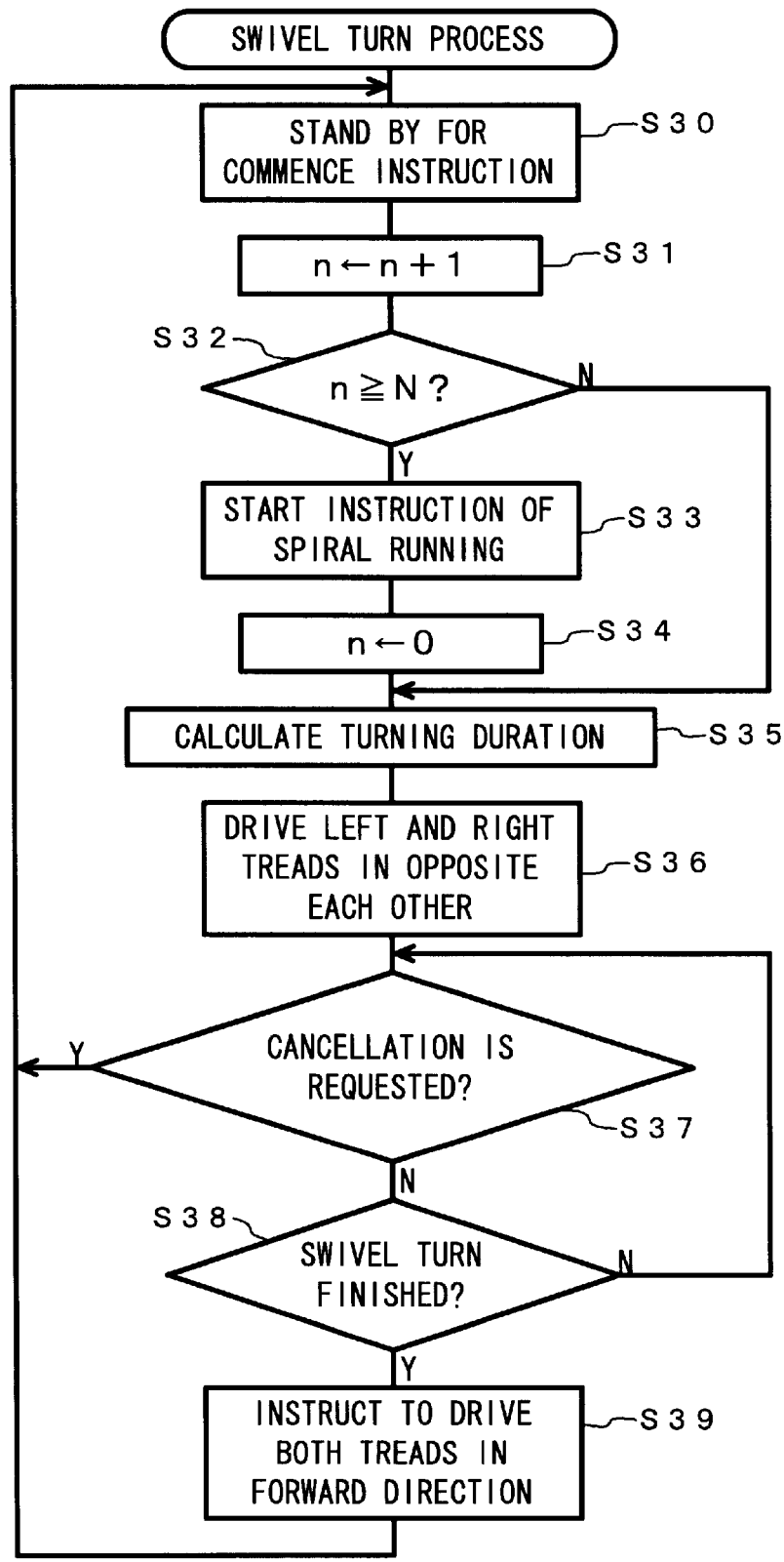
FIG. 15 is a flowchart showing control of swivel turn.

Referring to the swivel turn control of FIG. 15, Step S30 stands by for receiving the instruction of starting the swivel turning process. At Step S31, the current number n of the swivel turn times (referred to as the swivel times hereinafter) is incremented (+1). It is examined at Step S32 whether the swivel times n catches up to the predetermined number N.

Since the swivel times n is initialized to 0, it stands for 1 in the first routine. As it is judged not at Step S32, the procedure skips S33 and S34 and jumps to Step S35.

At Step S35, the duration of turning is calculated. Since the turning duration depends on the turning angle, it is determined in this embodiment in relation to the angle of 135 turning degrees specified for the fine-tuning random pattern running. After the calculation of the turning duration, the procedure moves to Step S36 where an instruction is made for driving the left tread 3 and the right tread 4 in opposite directions each other. The rotating directions of the two treads 3 and 4 are determined on the basis of the "turning direction" parameters shown in FIG. 13. It is then examined at Step S37 whether the cancellation is requested or not. If yes, the procedure returns back to Step S30. When the cancellation is not requested, it is judged at Step S38 whether the swivel turn is to be finished or not. When so, the procedure advances to Step S39 where an instruction is made for driving both the treads 3 and 4 in the forward direction to shift the running mode to the basic straight forward running motion.

When the swivel times n is turned to the predetermined number N, the procedure moves from Step S32 to Step S33 for starting the spiral running. At Step S34, the swivel times n used for judging a repeat of the swivel turn is cleared to zero. This is followed by Steps S35 to S39 for finishing the cycle of the Nth swivel turn and return to Step S30 for staying in stand-by until the next available instruction is received. Although the instruction for starting the spiral running is released at Step S33, the spiral running starts after the time T has elapsed (FIG. 14). Thereby, the two control operations for the spiral running and the swivel turn will never overlap each other.

Figure 16:
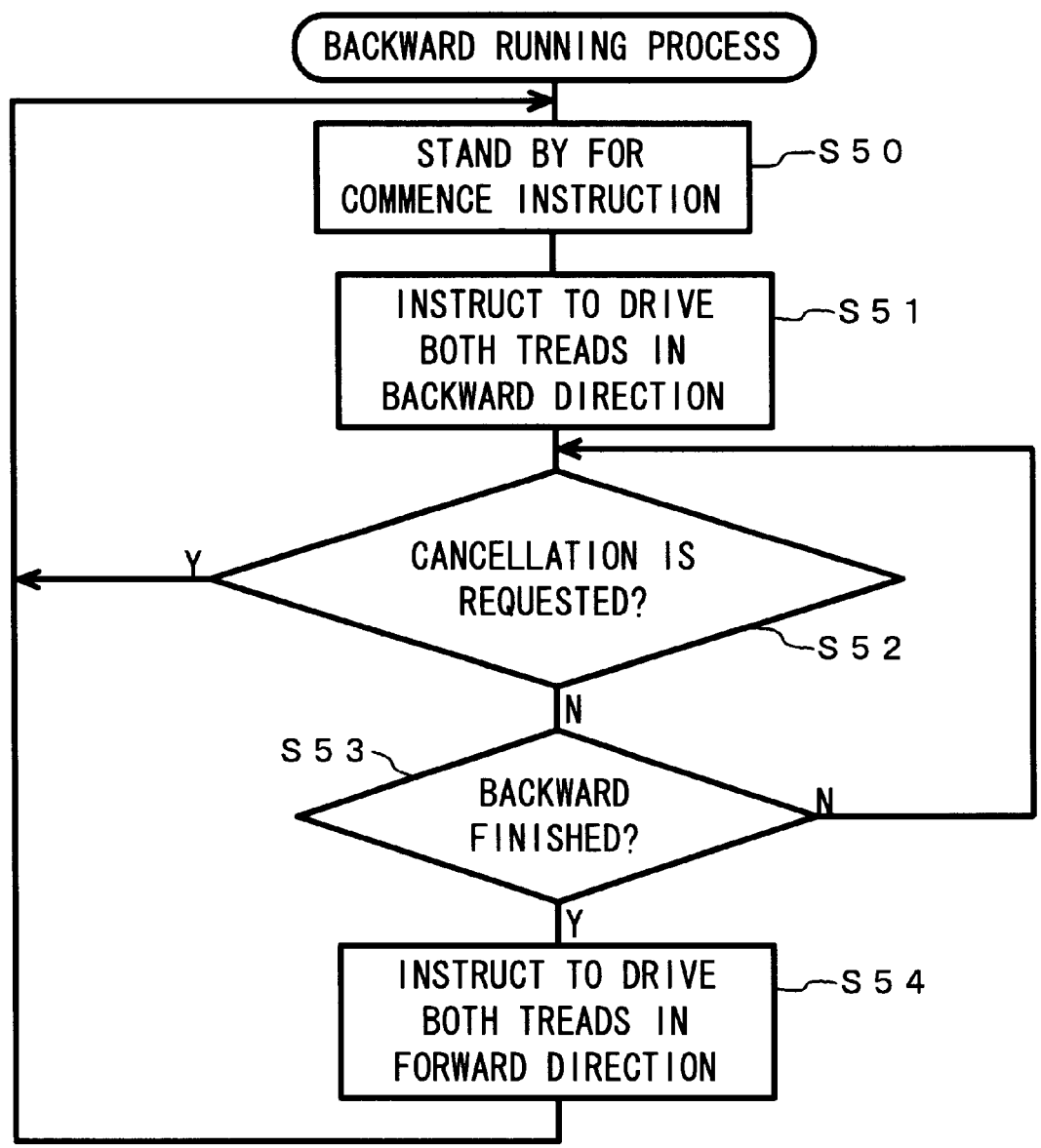
FIG. 16 is a flowchart showing control of backward running.

Referring to FIG. 16 for the backward running process, Step S50 stands by for receiving an instruction. At Step S51, an instruction is issued for driving the two treads 3 and 4 in the backward direction. It is then examined at Step S52 whether the cancel of the operation is released or not. When so, the procedure returns back to Step S50. If not, the procedure goes to Step S53 where it is examined whether the duration for the backward running is ended or not. When the backward running has been finished, the procedure moves to Step S54 for driving the two treads 3 and 4 in the forward direction.

Figure 17A:
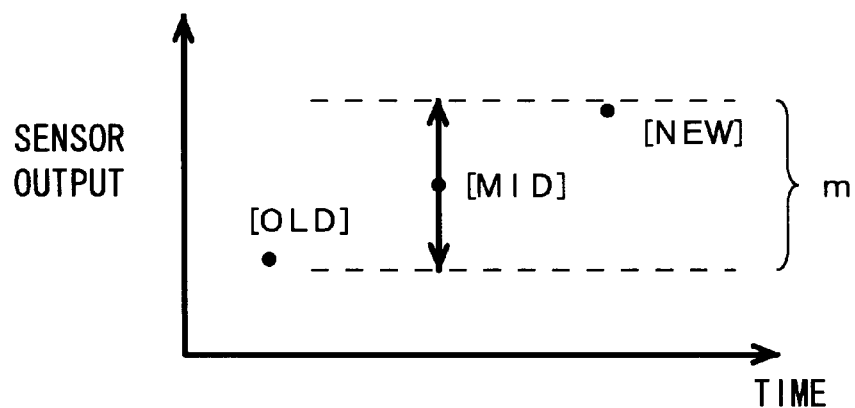
FIGS. 17A, 17B, and 17C are schematic diagrams showing control of selection of sensor signals.

The majority rule (for selection of the sensor output) in processing the outputs of the supersonic sensors (S180 in FIG. 10) is now explained. The use of the majority rule is preferable for improving the reliability of acquired data (of the distance count) which may be susceptible to the environment of the supersonic sensor group 6. In this embodiment, when a current data is acquired, the majority rule is applied on the current data and two old data to determine if the current data is available as a new data. As shown in FIG. 17A, a margin m is provided above and below the preceding data MID, respectively. When the current data NEW is within the margin m, it is judged as a normal detection signal and used as the distance count.

Figure 17B:
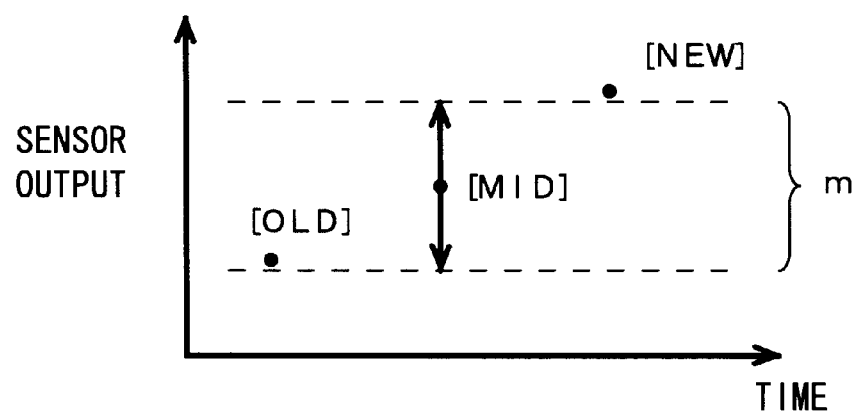

If the current data NEW is out of the margin m as shown in FIG. 17B, it is further examined whether or not the data OLD preceding the preceding data MID is within the margin m. When the data OLD is within the margin m, the preceding data MID is accepted as the normal detection signal and used as a new distance count in place of the current data NEW.

Figure 17C:
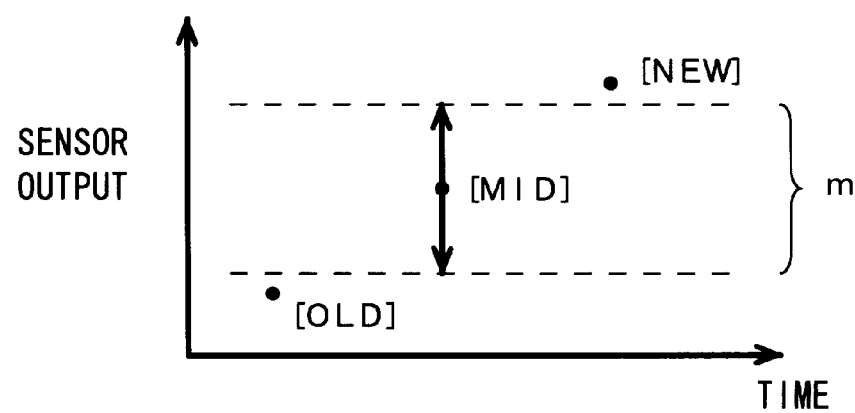

If both the data OLD and NEW are out of the margin m of the preceding data MID as shown in FIG. 17C, the current data NEW is used as the distance count because these three data are too much separated from each other and hardly identified as the normal detection signal.

The prevention of hunting and zig-zag motion during the running through a narrow passage according to the present invention will now be described. When the robot 1 is running into or through a narrow passage with two obstacles on its opposite sides, if it is simply controlled to turn toward one of the two obstacles to which the detected distance is longer for avoiding the other or shorter distanced obstacle, it may usually detect the longer distanced obstacle within a very short time and be caused to turn towards the opposite direction. In such a case, the robot 1 is likely to turn to the left and the right alternately upon every detection of the obstacles at very short intervals or cause a hunting motion to run through between the obstacles on its opposite sides. Such a hunting motion is detrimental to the robot 1 declining the efficiency of working operation. The first embodiment of the present invention prevents the hunting motion in the following manner.

For preventing the hunting motion, the supersonic senors 6 are divided into two, left and right, groups. When at least one of the sensors 6 in each of groups respectively detect the presence of obstacles at substantially the same time or within a predetermined short interval of time, the distance measurements from their respective sensors 6 of both groups to the obstacle on their side are summed, respectively, and a difference between the two sums of the distance measurements in both groups is calculated. When the difference of the sums of distances is greater than a predetermined reference value, the robot is steered clear of the obstacle on the side of the group where the sum of the distance measurements is smaller.

For example, if the sum of the distance measurements detected by the sensors of the right group is smaller, the robot 1 is controlled to turn to the left on the treads 14 and 15. Should the difference of the distance between the two groups of the sensors remain less than the reference value, the turning motion of the robot to avoid the obstacle is inhibited. The determination for the turning or avoiding motion may be carried by the CPU 8 in the controller 7 providing time interruption at intervals of a given time.

Although the prescribed embodiment permits each group to include two or more sensors, it is not of limitation but the present invention may be associated with a pair of the sensors, one in each group. The difference between the two distances deteted by the two, left and right, sensors is examined for determining whether the turning motion is executed or not. Also, the difference may be based on the average of the distance measurements instead of the sum of the distance measurements. In case of using the average distance, the number of the sensors must not be identical in both the groups.

Figure 18A:
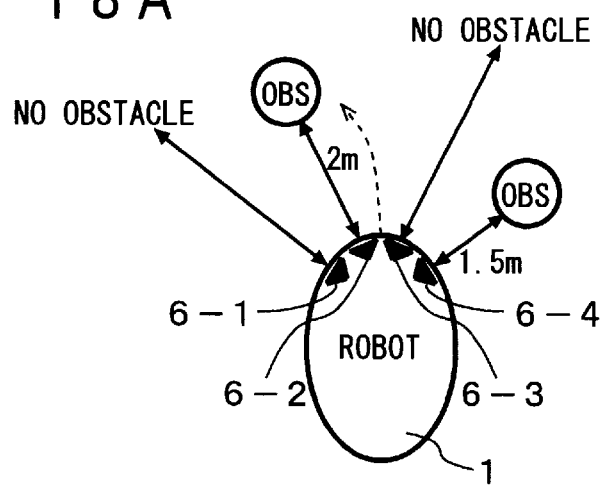
FIGS. 18A, 18B and 18C are schematic views showing the positional relation and the distance between a robot and obstacles.
Figure 18B:
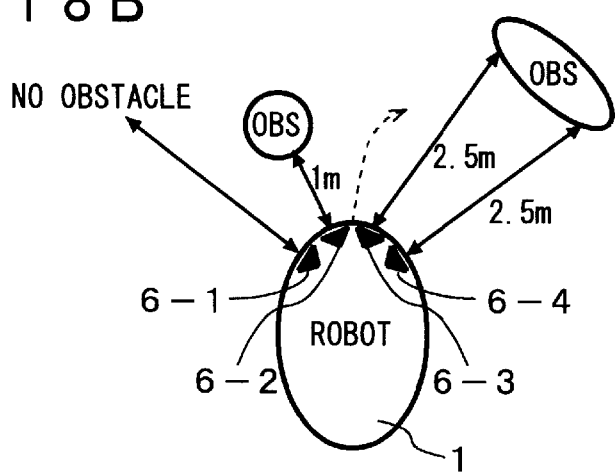
Figure 18C:
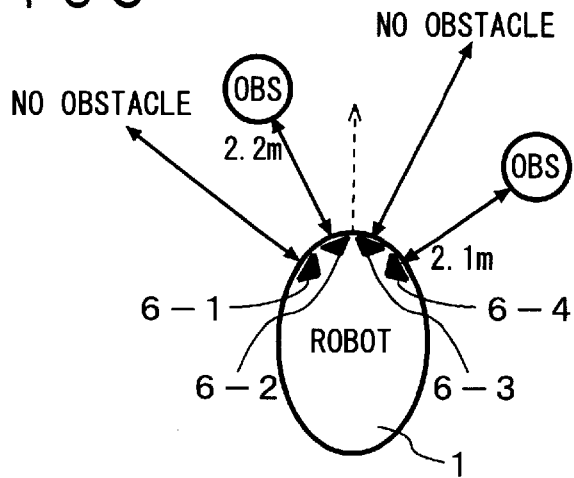

FIGS. 18A to 18C are schematic views showing examples of the prevention of hunting motion according to the present invention. In this examples, the sensors 6 are four: 6-1 and 6-2 allocated to the left group and 6-3 and 6-4 allocated to the right group. For ease of the description, the sensors in those examples are denoted by different numerals than those used in the above description. It is also assumed that the reference value is 0.2 m and the maximum detectable distance of the sensors 6 is 3 m. That means the sensor 6 reads 3 m if no obstacle is detected by it. In these figures, the obstacles are denoted by OBS.

As shown in FIG. 18A, the two sensors 6-1 and 6-3 detect no obstacles while the other two sensors 6-2 and 6-4 measure 2 m and 1.5 m of the distances, respectively. When the measurements have been summed in each group, it is given 5 m (=3 m+2 m) in the left group and 4.5 m (=3 m+1.5 m) in the right group. The difference between the two sums is then 0.5 m which is greater than the reference value of 0.2 m. This causes the robot 1 to turn to the left for avoiding the obstacle detected by the sensors 6 of the right group.

Referring to FIG. 18B, while the sensor 6-1 detects non, the three sensors 6-2, 6-3, and 6-4 measure 1 m, 2.5 m, and 2.5 m of the distances, respectively. Then, the sums are 4 m (=3 m+1 m) in the left group and 5 m (=2.5 m+2.5 m) in the right group. Since the difference is 1 m which is not less than the reference value of 0.2 m, the rightward turning motion is carried out for avoiding the obstacle detected on the left.

As shown in FIG. 18C, when the sensors 6-1 and 6-3 detect non, the other two sensors 6-2 and 6-4 measure 2.2 m and 2.1 m of the distances, respectively. Then, the sums are 5.2 m (=3 m+2.2 m) in the left group and 5.1 m (=3 m+2.1 m) in the right group. Since the difference is 0.1 m which is lower than the reference value of 0.2 m, the turning motion is not selected but the straight forward running is continued.

The response to an instruction of the turning motion given through examining the distance measurements is as follows. When the instruction of a new turning motion is released before a predetermined short length of time (for example, two seconds) has elapsed after the previous instruction and the direction for the new turning motion is opposite to that of the preceding turning motion, the new turning is instructed to be made through a smaller angle than the preceding turning.

In common, the angle of turning is defined for the normal turning motion by the difference of rotation speed between the two, left and right, treads of the robot 1 and for the swivel turning and the pivot turning by the rotating movements of their respective treads. The above mentioned response allows the robot 1 to, when running through a place where the hunting motion is inevitable otherwise, minimize the number of hunting turns as compared with the conventional manner and travel a across substantially the center between the obstacles.

Figure 19:
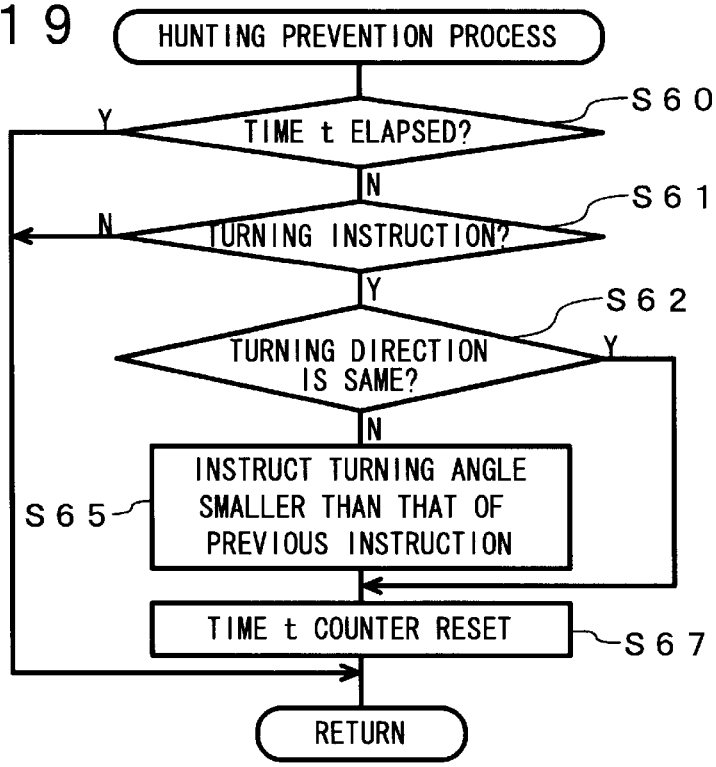
FIG. 19 is a flowchart showing a procedure of preventing a hunting motion.

The response to the turning motion instruction is now described in more detail referring to a flowchart shown in FIG. 19. At Step S60, it is examined whether the predetermined length of time t has elapsed or not after release of the previous instruction. If not, the procedure goes to Step S61 where it is examined whether an instruction of the turning motion is given or not. If it is judged yes at Step S60 or no at Step S61, the procedure for preventing the hunting motion is terminated.

When it is judged at Step S61 that the instruction is released, the procedure advances to Step S62 where it is examined whether or not the direction for the present turning motion is the same as of the previous instruction. If not, Step S65 follows where the angle of turning is set at a smaller degree than that of the previous instruction and the procedure goes to Step S67. Accordingly, the rotating speeds of the left and right treads 3 and 4 are determined causing the robot 1 to turn through the smaller angle.

When the direction for the turning motion is the same, the procedure skips Step S65 and selects the normal turning angle (for example, 135 degrees for the swivel turning motion). This is followed by Step S67 for resetting a counter to count the time t and then, the end of the procedure.

Figure 20:
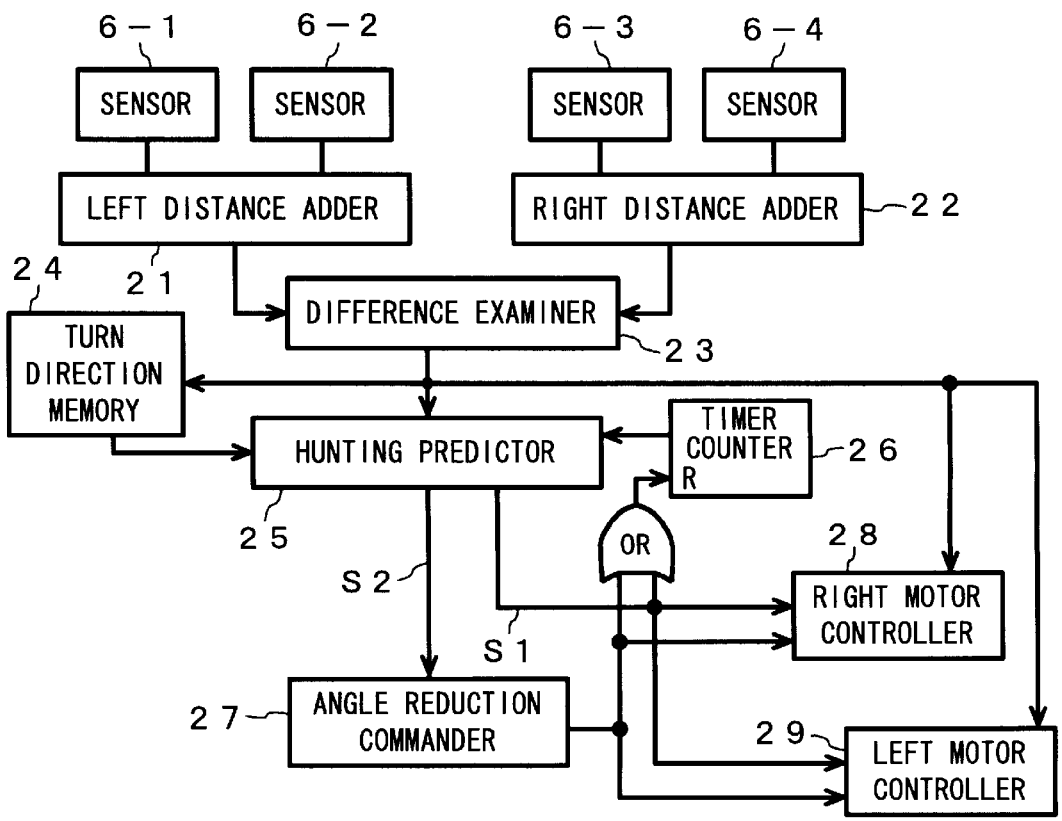
FIG. 20 is a block diagram showing a primary part of the controller for preventing the hunting motion.

The operation of the controller 7 will be described for the procedure of preventing the hunting motion. FIG. 20 is a block diagram showing a primary part of the controller 7 for preventing the hunting motion. The distance measurements to the obstacle detected by the two sensors 6-1 and 6-2 of the left group are summed in a left distance adder 21. Similarly, the distance measurements to the obstacle detected by the two other sensors 6-3 and 6-4 of the right group are summed in a right distance adder 22.

A distance difference examiner 23 is provided for examining whether or not the difference between the sums of the two groups is within the reference value. When the difference is out of the reference value, the instruction of the turning motion is released. The instruction is given to both a right motor controller 28 and a left motor controller 29.

The instruction of the turning motion includes the rotating direction and the speed of each motor which are supplied to the right motor controller 28 and the left motor controller 29. Also, the direction of turning determined by the rotating direction and the speed of each motor is saved in a turning direction memory 24 for use in the succeeding procedure. A hunting predictor 25 is responsive to the direction of the current turning, the direction of previous the turning retrieved from the memory 24, and the output of a timer counter 26 for determining whether the hunting motion likely to occurs or not as shown in FIG. 19.

The timer counter 26 serves as a timer (for example, a two-second timer) for counting down the time t for judging the feasibility of a hunting motion. When the time counter 26 is counted up and when the current direction of turning is identical to the previous turning direction, the hunting predictor 25 delivers a non-hunting signal s1. If the time counter 26 is not counted up and the direction of the current turning is difference from the previous one, the hunting predictor 25 releases a hunting signal s2.

In addition, an angle reduction commander 27 is responsive to the hunting signal s2 for instructing the right and left motor controllers 28 and 29 to produce a smaller degree of the turning angle for the robot 1. If the non-hunting signal s1 is released from the hunting predictor 25, it determines the speeds of the left and right treads in a general operation mode from the table shown in FIG. 13. The signals s1 and s2 from the hunting predictor 25 are also transmitted as reset signals to the time counter 26 which starts counting down the time t upon being reset.

As set forth above, the present embodiment allows the robot to, upon detecting one or more obstacles with its sensors on both the left and right sides at a time or within a short interval of time, control and attenuate the hunting motion which otherwise can occur, thus ensuring the efficiency of running motion without redundant movements. Accordingly, the robot of the present invention can smoothly run along a narrow corridor or through a narrow passage between obstacles or furnishings. In spite of the foregoing arrangement, there may be a case that the robot is hanged up in a corner or moved into a too narrow passage which is narrower than the width of the robot and has to move backward for escape.

Figure 21:
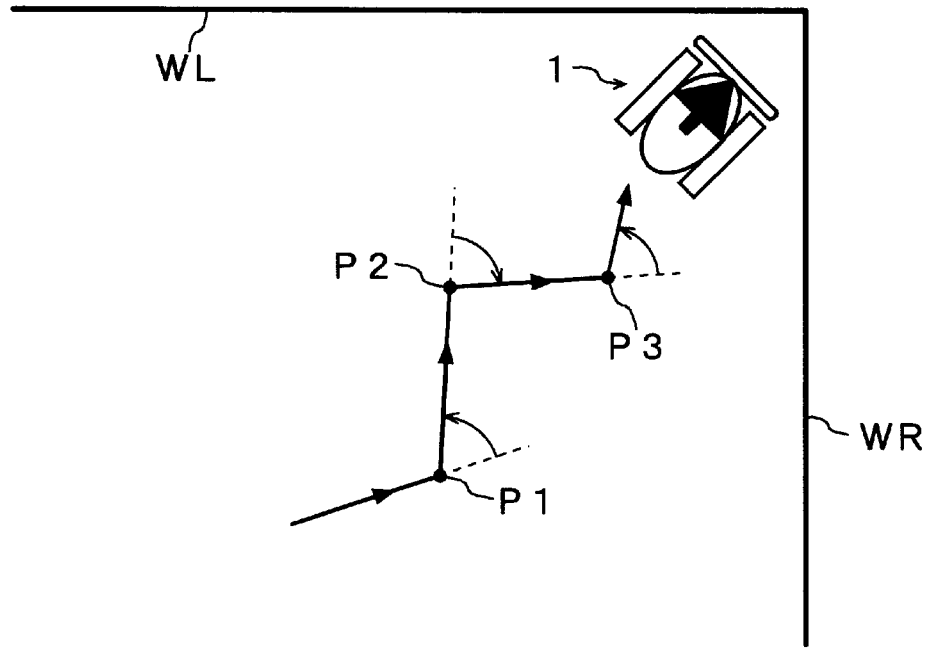
FIG. 21 is a schematic view showing the robot coming into a deadlock state.

The procedure of an escape mode action is now described. FIG. 21 illustrates the robot 1 being held up in a corner of the area or at its deadlock state. When the robot 1 detects a right wall WR at the point P1, it turns to the left to avoid the right wall WR. It is assumed that the distance from the point P1 to the right wall WR is too close for the robot 1 to escape without performing a swivel turn. On detecting a left wall WL at the point P2 after avoiding the right wall WR, the robot 1 turns (or swivels) to the right to avoid the left wall WL. As the robot 1 repeats such zigzag motions with the interval of the turns becoming shorter, it moves into the corner and is finally held up when detecting both the left and right wall WL and WR at a short distance from the robot 1.

While the robot 1 is held up, it hardly escapes using the normal mode operation. For countermeasure, the escape motion is carried out when the robot 1 has repeated the swivel turn a predetermined number of times and it is judged that the hunting motion has started in the corner.

Figure 22:
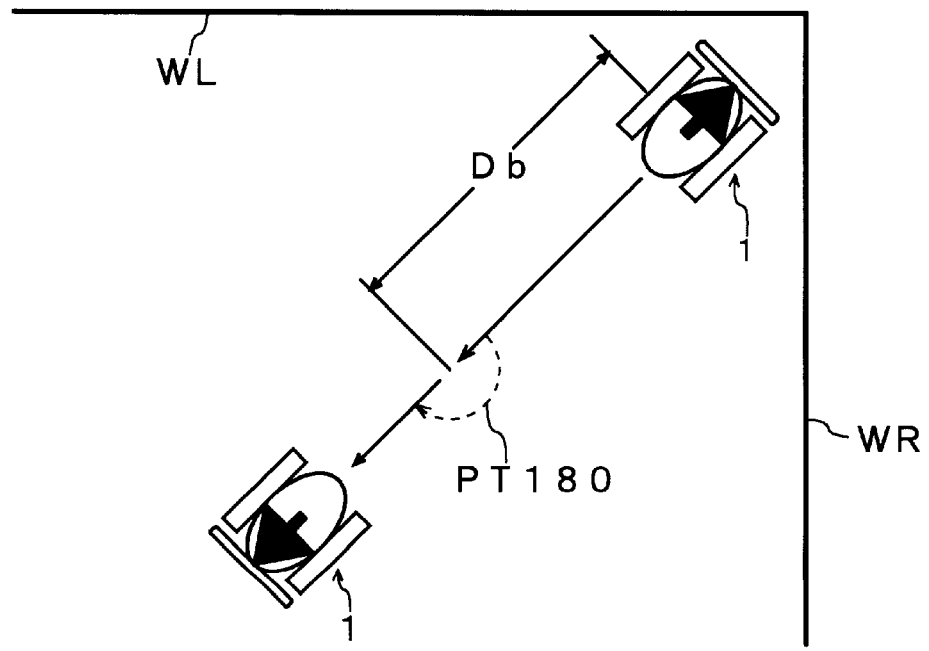
FIG. 22 is a schematic view showing an escape motion of the robot from its deadlock state.

FIG. 22 is a schematic view showing a route of the robot 1 in the escape motion. The escape motion of the robot 1 from the deadlock state comprises running backward a longer distance Db than that of the normal backward motion and swiveling thereafter through 180 degrees (PT180). The distance Db may be determined by the time of the backward running or the rotation number of the treads 3 and 4.

Figure 23:
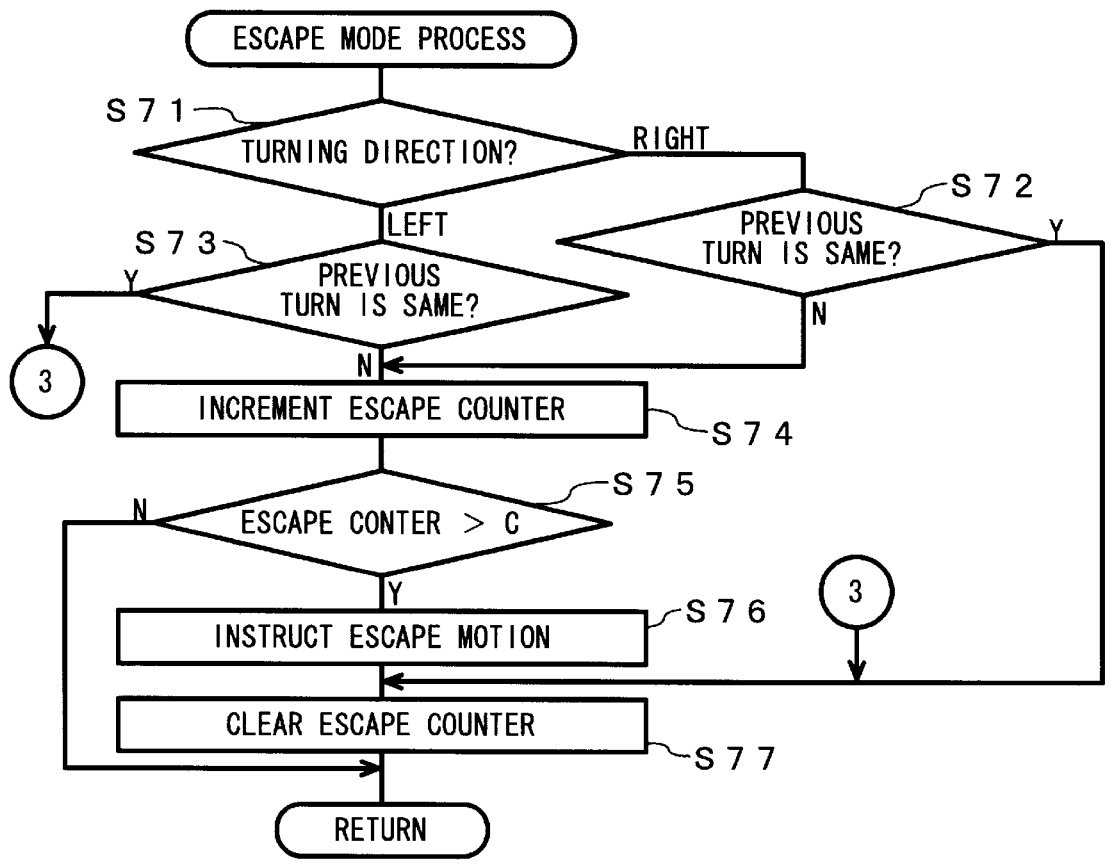
FIG. 23 is a flowchart showing the escape motion.

The escape motion will be described in more detail referring to a flowchart shown in FIG. 23. It is examined at Step S71 whether a current swivel turn of the robot is in the rightward or leftward direction on the basis of the rotation directions of the left and right motors. Depending on the direction of the current swivel turn, the procedure goes to Step S72 or S73. It is examined at each of Steps S72 and S73 whether or not the current direction of the swivel turn is identical to that of the previous turn. When it is judged that the turning directions are identical with each other, the hunting motion is not involved and the escape counter is cleared at Step S77 before terminating the procedure.

When the direction of the current swivel turn is not identical to that of the previous one, the hunting motion may be involved and the procedure goes to Step S74. At Step S74, the count of the escape counter or the number of swivel turns in the opposite direction is incremented for determining whether the escape motion shall be instructed or not. The initial valve of the escape counter is zero. It is then examined at Step S75 whether or not the count of the escape counter exceeds a predetermined value C (for example, 10). When so, the procedure goes to Step S76 for giving an instruction for the escape motion. The escape motion includes a backward motion to a predetermined length of distance (for example, 1 m which is a little longer than that in the normal operatoion) and a following swivel or pivot turn through 180 degrees. After the instruction for the escape motion is delivered, the procedure moves to Step S77 where the escape counter is cleared and then, is ended.

Figure 24:
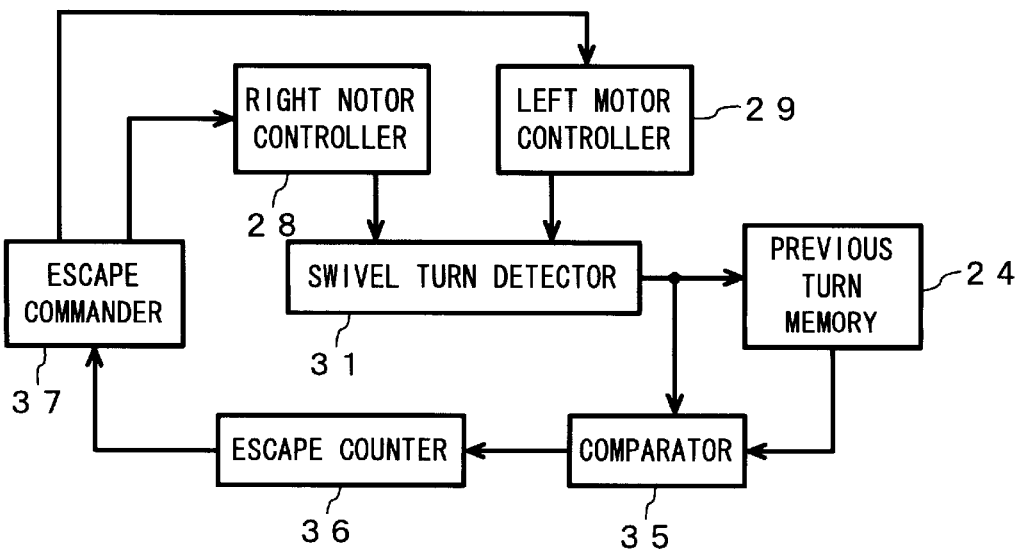
FIG. 24 is a block diagram showing a primary part of the controller for carrying the escape motion.

The arrangement for carrying out the escape motion is described. FIG. 24 is a block diagram showing a primary part of the escape motion arrangement. The swivel turn is detected by a swivel turn detector 31 monitoring the two motors 14 and 15 controlled with their respective motor controllers 28 and 29 and its direction is saved in a previous turn memory 24.

A comparator 35 is provided for comparing the direction of a current turn with that of the previous turn. When the two directions are identical, a clear signal is given to the escape counter 36. If they are not identical, an increment signal is delivered to the same. When the count of the escape counter 36 reaches the predetermined value, a count-up signal is transferred to an escape commander 37.

Upon receiving the countup signal, the escape commander 37 supplies the right and left motor controllers 28 and 29 with instructions for carrying out the escape motion, that is, a combination of the predetermined distance of the backward running and the swivel turn. The swivel turn following the backward running may be a pivot turn or a common turn.

As set forth above, according to the present invention, the run parameters are determined on the basis of the measurements of the sensors mounted on both the left and right sides of the robot and desired ones used for the actual operation are selected out of the run parameters according to the priority rule. As each of the two controllers connected to their corresponding sensors produces the run parameters for intra-side motor regardless of the opposite side controller, its operation is simplified. In particular, this allows the robot to readily escape from its deadlock state e.g. in a corner of the working area.

What is claimed is:

1. A control device for a mobile robot in which a direction of turn and an angle of turn are determined by directions of rotation and speeds of rotation of both left and right wheels of the robot, comprising:
   a right side obstacle sensor mounted on the right front of a main body of the robot;
   a left side obstacle sensor mounted on the left front of the main body;
   means for generating at least two set of run parameters, each set of parameters including at least the direction of the turn, a speed of an intra-side wheel, and a speed of an opposite side wheel, in accordance with a distance to an obstacle detected by each obstacle sensor; and
   means for determining the direction of rotation and the speed of rotation for each of the left and right wheels on the basis of a run parameter selected from said at least two sets of the run parameters for preventing collision against the obstacle according to a predetermined priority rule,
   wherein when both the left and right side sensors detect obstacles at an interval of time which is shorter than a reference valve, their measurements of distance to the obstacles are compared with each other to determine the speeds of rotation of the left and right wheels for turning towards the obstacle to which the distance is longer and when a current turn which is to be conducted upon detecting obstacles by the left and right side sensors at the short interval of time is opposite in the direction to the previous turn, a turning angle of the current turn is set smaller than that of the previous turn.

2. A control device for a mobile robot according to claim 1, wherein the left and right side obstacle sensors consist of a same number of sensor elements, respectvely and each distance to the obstacle detected by the sensor is a sum of measurements detected by the sensor elements.

3. A control device for a mobile robot according to claim 2, wherein in calculation of the sum of the measurements detected by the sensor elements, the distance from a sensor element which detects no obstacle is defined as a predetermined maximum detecting range of the sensor element.

4. A control device for a mobile robot according to claim 1, wherein at least one of the left and right side obstacle sensors consists of a plurality of sensor elements and each distance to the obstacle detected by the sensor is an average of measurements detected by the sensor elements.

5. A control device for a mobile robot according to claim 4, wherein in calculation of the average of the measurements detected by the sensor elements, the distance from a sensor element which detects no obstacle is defined as a predetermined maximum detecting range of the sensor element.

6. A control device for a mobile robot according to claim 1, further comprising means for inhibiting the turn when a difference between the distances measured by the left and right side obstacle sensors is smaller than a predetermined reference value.

7. A control device for a mobile robot according to claim 1, wherein the speed of rotation of each of the left and right wheels which is one of the run parameters is set at a lower rate when the distance to the obstacle on intra-side is shorter.

8. A control device for a mobile robot in which a direction of turn and an angle of turn are determined by directions of rotation and speeds of rotation of both left and right wheels of the robot, comprising:
   a right side obstacle sensor mounted on the right front of a main body of the robot;
   a left side obstacle sensor mounted on the left front of the main body;
   means for generating at least two set of run parameters, each set of parameters including at least the direction of the turn, a speed of an intra-side wheel, and a speed of an opposite side wheel, in accordance with a distance to an obstacle detected by each obstacle sensor; and
   means for determining the direction of rotation and the speed of rotation for each of the left and right wheels on the basis of a run parameter selected from said at least two sets of the run parameters for preventing collision against the obstacle according to a predetermined priority rule,
   means for inhibiting the turn when a difference between the distances measured by the left and right side obstacle sensors is smaller than a predetermined reference value,
   wherein when both the left and right side sensors detect obstacles at an interval of time which is shorter than a reference valve, their measurements of distance to the obstacles are compared with each other to determine the speeds of rotation of the left and right wheels for turning towards the obstacle to which the distance is longer.

9. A control device for a mobile robot according to claim 8, wherein the left and right side obstacle sensors consist of a same number of sensor elements, respectively and each distance to the obstacle detected by the sensor is a sum of measurements detected by the sensor elements.

10. A control device for a mobile robot according to claim 9, wherein in calculation of the sum of the measurements detected by the sensor elements, the distance from a sensor element which detects no obstacle is defined as a predetermined maximum detecting range of the sensor element.

11. A control device for a mobile robot according to claim 8, wherein at least one of the left and right side obstacle sensors consists of a plurality of sensor elements and each distance to the obstacle detected by the sensor is an average of measurements detected by the sensor elements.

12. A control device for a mobile robot according to claim 11, wherein in calculation of the average of the measurements detected by the sensor elements, the distance from a sensor element which detects no obstacle is defined as a predetermined maximum detecting range of the sensor element.

13. A control device for a mobile robot according to claim 8, wherein the speed of rotation of each of the left and right wheels which is one of the run parameters is set at a lower rate when the distance to the obstacle on intra-side is shorter.

14. A control device for a mobile robot in which a direction of turn and an angle of turn are determined by directions of rotation and speeds of rotation of both left and right wheels of the robot, comprising:
   a right side obstacle sensor mounted on the right front of a main body of the robot;
   a left side obstacle sensor mounted on the left front of the main body;
   means for generating at least two set of runn parameters, each set of parameters including at least the direction of the turn, a speed of an intra-side wheel, and a speed of an opposite side wheel, in accordance with a distance to an obstacle detected by each obstacle sensor; and means for determining the direction of rotation and the speed of rotation for each of the left and right wheels on the basis of a run parameter selected from said at least two sets of the run parameters for preventing collision against the obstacle according to a predetermined priority rule, means for judging a deadlock state of the robot when a current turn which is different in the direction from the preceding turn has been repeated a predetermined number of times, wherein the robot is caused, in response to the judgement of the deadlock state, to perform a backward running by a predetermined distance and then a turn to escape its deadlock state.

15. A control device for a mobile robot according to claim 14, wherein the speed of rotation of each of the left and right wheels which is one of the run parameters is set at a lower rate when the distance to the obstacle on intra-side is shorter.

16. A control device for a mobile robot according to claim 14, wherein the turn is one of a pivot turn when the distance to the obstacle detected by the obstacle sensor is smaller and a swivel turn when the distance to the obstacle detected by the obstacle sensor is much smaller.

17. A control device for a mobile robot according to claim 14, wherein the turn is only a swivel turn when the distance to the obstacle detected by the sensor is much smaller.

* * * * *